US011401447B2

(12) United States Patent
El Hedok et al.

(10) Patent No.: US 11,401,447 B2
(45) Date of Patent: Aug. 2, 2022

(54) INTERNALLY INCORPORATED PHENOLIC RESINS IN WATER-BASED (METH)ACRYLATE ADHESIVE COMPOSITIONS, PRE-ADHESIVE REACTION MIXTURES, METHODS, AND ARTICLES

(71) Applicant: 3M INNOVATIVE PROPERTIES COMPANY, St. Paul, MN (US)

(72) Inventors: Ibrahim A. El Hedok, Concord, NC (US); Mahfuza B. Ali, Mendota Heights, MN (US); Elizabeth E. Johnson, Afton, MN (US); Mark D. Purgett, Oakdale, MN (US); Youhoon Kim, Woodbury, MN (US); Prince P. Antony, London (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 333 days.

(21) Appl. No.: 16/807,839

(22) Filed: Mar. 3, 2020

(65) Prior Publication Data

US 2020/0199422 A1  Jun. 25, 2020

Related U.S. Application Data

(63) Continuation of application No. 16/061,780, filed as application No. PCT/US2016/066271 on Dec. 13, 2016, now Pat. No. 10,597,564.

(60) Provisional application No. 62/270,710, filed on Dec. 22, 2015.

(51) Int. Cl.
| *C09J 161/14* | (2006.01) |
| *C09J 161/06* | (2006.01) |
| *C09J 133/14* | (2006.01) |
| *C08L 61/06* | (2006.01) |
| *C08L 33/14* | (2006.01) |
| *C08L 61/14* | (2006.01) |
| *C08F 220/18* | (2006.01) |
| *C08G 8/12* | (2006.01) |
| *C08G 8/30* | (2006.01) |
| *C08F 218/08* | (2006.01) |

(52) U.S. Cl.
CPC ....... *C09J 161/14* (2013.01); *C08F 220/1808* (2020.02); *C08L 33/14* (2013.01); *C08L 61/06* (2013.01); *C08L 61/14* (2013.01); *C09J 133/14* (2013.01); *C09J 161/06* (2013.01); *C08F 218/08* (2013.01); *C08G 8/12* (2013.01); *C08G 8/30* (2013.01)

(58) Field of Classification Search
CPC ...... C09J 161/14; C09J 133/14; C09J 161/06; C09J 7/20; C08F 220/1808; C08F 218/08; C08L 33/14; C08L 61/06; C08L 61/14; C08G 8/12; C08G 8/30
See application file for complete search history.

(56) References Cited

U.S. PATENT DOCUMENTS

| 3,347,935 | A | 10/1967 | Kaupp |
| 3,692,884 | A | 9/1972 | Gaskell |
| 3,976,606 | A | 8/1976 | Gobran |
| 4,181,752 | A | 1/1980 | Martens |
| 4,374,883 | A | 2/1983 | Winslow |
| 4,677,096 | A | 6/1987 | Van Der Smissen |
| 4,798,201 | A | 1/1989 | Rawlings |
| 5,164,441 | A | 11/1992 | Yang |
| 5,216,050 | A | 6/1993 | Sinclair |
| 5,223,465 | A | 6/1993 | Ueki |
| 5,290,615 | A | 3/1994 | Tushaus |
| RE34,605 | E | 5/1994 | Schrenk |
| 5,360,659 | A | 11/1994 | Arends |
| 5,387,623 | A | 2/1995 | Ryan |
| 5,457,175 | A | 10/1995 | Scharrer |
| 5,579,162 | A | 11/1996 | Rd |
| 5,623,011 | A | 4/1997 | Bernard |
| 5,695,837 | A | 12/1997 | Everaerts |
| 5,726,220 | A | 3/1998 | Tokushige |
| 5,804,610 | A | 9/1998 | Hamer |
| 5,882,774 | A | 3/1999 | Jonza |
| 6,048,611 | A | 4/2000 | Lu |
| 6,049,419 | A | 4/2000 | Wheatley |
| 6,160,083 | A | 12/2000 | Thompson |
| 6,294,249 | B1 | 9/2001 | Hamer |

(Continued)

FOREIGN PATENT DOCUMENTS

| DE | 4428645 | 2/1995 |
| EP | 0624392 | 11/1994 |

(Continued)

OTHER PUBLICATIONS

Alothman, "A Review: Fundamental Aspects of Silicate Mesoporous Materials", Materials, 2012, vol. 5, No. 12, pp. 2874-2902.

(Continued)

*Primary Examiner* — Daniel H Lee
(74) *Attorney, Agent, or Firm* — 3M IPC

(57) ABSTRACT

Cationic or zwitterionic polymer adhesives, adhesive articles, aqueous polymerizable pre-adhesive reaction mixtures, and methods of preparation that include internal incorporation of a phenolic resin. The aqueous polymerizable pre-adhesive reaction mixtures include one or more cationic (meth)acrylate monomers, one or more low Tg nonionic monomer having a (meth)acryloyl group, optionally one or more anionic (meth)acrylate monomers, and one or more phenolic resins.

15 Claims, No Drawings

(56) References Cited

U.S. PATENT DOCUMENTS

| | | | |
|---|---|---|---|
| 6,489,392 B1* | 12/2002 | Lappalainen | C09J 161/24 524/53 |
| 6,710,128 B1 | 3/2004 | Helmer | |
| 6,930,219 B2 | 8/2005 | Shan | |
| 7,008,987 B2 | 3/2006 | Okada | |
| 7,294,861 B2 | 11/2007 | Schardt | |
| 7,559,981 B2 | 7/2009 | Friday | |
| 8,124,169 B2 | 2/2012 | Ylitalo | |
| 8,450,420 B2 | 5/2013 | Sakurai | |
| 8,742,022 B2 | 6/2014 | Pokorny | |
| 9,828,530 B2 | 11/2017 | Ali | |
| 2007/0092733 A1 | 4/2007 | Yang | |
| 2007/0179218 A1 | 8/2007 | Brake | |
| 2007/0276090 A1 | 11/2007 | Aoki | |
| 2008/0199704 A1 | 8/2008 | Ho | |
| 2009/0018237 A1 | 1/2009 | Fujii | |
| 2009/0087629 A1 | 4/2009 | Everaerts | |
| 2010/0086705 A1 | 4/2010 | Everaerts | |
| 2012/0015002 A1 | 1/2012 | Ali | |
| 2012/0270978 A1 | 10/2012 | Myers | |
| 2012/0328808 A1 | 12/2012 | Mehlmann | |
| 2013/0184394 A1 | 7/2013 | Satrijo et al. | |
| 2014/0130827 A1 | 5/2014 | Dotterman | |
| 2014/0138131 A1 | 5/2014 | Hao | |
| 2014/0170362 A1* | 6/2014 | Ali | C09J 133/14 428/354 |
| 2014/0186250 A1 | 7/2014 | Levan | |
| 2015/0024019 A1 | 1/2015 | Ali | |
| 2015/0035204 A1 | 2/2015 | Stoner | |
| 2015/0140329 A1 | 5/2015 | Tanrikulu | |
| 2015/0175812 A1 | 6/2015 | Ali | |
| 2015/0293028 A1 | 10/2015 | Kang | |
| 2018/0105628 A1 | 4/2018 | Wendland | |

FOREIGN PATENT DOCUMENTS

| | | |
|---|---|---|
| EP | 2078696 | 7/2009 |
| JP | 2003-286401 | 10/2003 |
| JP | 2004-010842 | 1/2004 |
| JP | 4223269 | 6/2004 |
| JP | 2011-006615 | 1/2011 |
| WO | WO 97/33945 | 9/1997 |
| WO | WO 03/095514 | 11/2003 |
| WO | WO 2006/103754 | 10/2006 |
| WO | WO 2008/043716 | 4/2008 |
| WO | WO 2014/018817 | 1/2014 |
| WO | WO 2014/078088 | 5/2014 |
| WO | WO 2014/093375 | 6/2014 |
| WO | WO 2014/105584 | 7/2014 |
| WO | WO 2015/157612 | 10/2015 |
| WO | WO 2015/157615 | 10/2015 |
| WO | WO 2015/195602 | 12/2015 |
| WO | WO 2015/195616 | 12/2015 |
| WO | WO 2015/195617 | 12/2015 |
| WO | WO 2016/105998 | 6/2016 |
| WO | WO 2016/109176 | 7/2016 |
| WO | WO 2017/106443 | 6/2017 |
| WO | WO 2017/106448 | 6/2017 |
| WO | WO 2017/112386 | 6/2017 |
| WO | WO 2018/102267 | 6/2018 |

OTHER PUBLICATIONS

Alslaibi, "A review: production of activated carbon from agricultural byproducts via conventional and microwave heating", Journal of Chemical Technology and Biotechnology, 2013, vol. 88, pp. 1183-1190.

Barrer, "Molecular Diffusion in Chabazite, Mordenite and Levynite", Transactions of the Faraday Society, 1953, vol. 49, pp. 1049-1059.

Boettcher, "Silica Sol-Gel Glasses with Embedded Organic Liquids", Advanced Materials, 1999, vol. 11, No. 2, pp. 138-141.

Eguiburu, "Blends of amorphous and crystalline polylactides with poly(methyl methacrylate) and poly(methyl acrylate): a miscibility study", Polymer, 1998, vol. 39, No. 26, pp. 6891-6897.

Gajria, "Miscibility and biodegradability of blends of poly (lactic acid) and poly (vinyl acetate)", Polymer, 1996, vol. 37, No. 3, pp. 437-444.

Hao, "Thermal and Mechanical Properties of Polylactide Toughened with a Butyl Acrylate-Ethyl Acrylate-Glycidyl Methacrylate Copolymer", Chinese Journal of Polymer Science, 2013, vol. 31, No. 11, pp. 1519-1527.

Meng, "Transparent and ductile poly(lactic acid)/poly(butyl acrylate) (PBA) blends: Structure and properties", European Polymer Journal, 2012, vol. 48, pp. 127-135.

Niu, "Highly dispersed Ru on K-doped meso-macroporous $SiO_2$ for the preferential oxidation of CO in $H_2$-rich gasses", International Journal of Hydrogen Energy, 2014, vol. 39, pp. 13800-13807.

Song, "Coordination of Metal Cations with Amino-Functionalized MCM-41 for Adsorptive Desulfurization", Advanced Materials Research, May 2014, vols. 926-930, pp. 4222-4225.

Temel, "Photopolymerization and photophysical properties of amine linked benzophenone photoinitiator for free radical polymerization", Journal of Photochemistry and Photobiology A: Chemistry, 2011, vol. 219, No. 1, pp. 26-31.

Yang, "A Pervaporation Study of Ammonia Solutions Using Molecular Sieve Silica Membranes", Membranes, 2014, vol. 4, pp. 40-54.

International Search Report for PCT International Application No. PCT/US2016/066271, dated May 17, 2017, 6 pages.

* cited by examiner

INTERNALLY INCORPORATED PHENOLIC RESINS IN WATER-BASED (METH)ACRYLATE ADHESIVE COMPOSITIONS, PRE-ADHESIVE REACTION MIXTURES, METHODS, AND ARTICLES

CROSS REFERENCE TO RELATED APPLICATION

This application claims the benefit of Utility application Ser. No. 16/061,780, filed Dec. 13, 2016, which claims the benefit of U.S. Provisional Patent Application No. 62/270,710, filed Dec. 22, 2015, the disclosure of which is incorporated by reference herein in its entirety.

BACKGROUND

When applying a surface coating, such as paint or stain, to a surface, care must be taken so that the paint does not get on the surfaces adjacent to the surface to be painted. This can be accomplished by carefully painting the surface, or by masking off the area around the surface to be painted. Masking articles, such as masking tapes and adhesive masking sheets, are often used to protect the area adjacent to the surface being painted. When using such masking articles, it is generally desirable that the paint not bleed past the demarcation line defined by the edge of the masking article. In this manner, the masking article will produce a paint line between the painted surface and unpainted surface that is smooth and consistent, and precisely matches the line intended by the user. Depending on a number of factors, such as how well such masking articles are applied to the surface, the energy of the surface, and the texture of the surface to which such masking articles are applied, paint may flow beyond the edge of the masking article and under certain regions of the masking article, thereby producing an imprecise paint line.

Paints continue to be developed, particularly those that are easy to clean and/or that have low or no volatile organic compound content. Surfaces painted with such paints can provide problems for masking articles and other adhesive articles with respect to binding properties. That is, easy to clean and/or low/no VOC painted surfaces are very problematic for most (meth)acrylate-based and rubber-based masking tapes. New adhesives are needed, particularly water-based adhesive compositions.

SUMMARY

The present disclosure provides an adhesive composition that contains a cationic or zwitterionic polymer plus one or more phenolic resins, adhesive articles, aqueous polymerizable pre-adhesive reaction mixtures, and methods of preparation of the adhesive composition. The aqueous polymerizable pre-adhesive reaction mixtures include one or more cationic (meth)acrylate monomers, one or more low Tg nonionic monomers having a (meth)acryloyl group, optionally one or more anionic (meth)acrylate monomers, and one or more phenolic resins.

In some embodiments, the present disclosure provides an aqueous polymerizable pre-adhesive reaction mixture that includes: water; one or more cationic (meth)acrylate monomers dissolved in water; and a dispersed phase comprising one or more low Tg nonionic monomer having a (meth) acryloyl group and one or more phenolic resins. In some embodiments, the pre-adhesive reaction mixture further includes one or more anionic (meth)acrylate monomers.

In some embodiments, a polymerized product of an aqueous pre-adhesive reaction mixture as described herein is provided. The aqueous pre-adhesive reaction mixture can be referred to as an "emulsion" and the polymerized product of the aqueous pre-adhesive reaction mixture can be referred to as an "emulsion polymer" or like term. The dried polymerized product is the adhesive composition. In some embodiments, the present disclosure provides an adhesive composition that includes a cationic or zwitterionic polymer plus one or more phenolic resins. In some embodiments, the adhesive composition includes 70 wt-% to 98 wt-% of a cationic or zwitterionic polymer and 2 wt-% to 30 wt-% of a phenolic resin, based on the total weight of the cationic or zwitterionic polymer plus the phenolic resin.

In some embodiments, the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

In some embodiments, the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

50 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof; and wt-% to 5 wt-%, based on the total weight of the monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In some embodiments, the one or more phenolic resins include a terpene phenolic resin, an alkyl phenolic resin, or combinations thereof.

Also disclosed are articles, and methods of making the adhesive articles.

In some embodiments, the present disclosure provides an adhesive article that includes a support having first and second opposed major surfaces, and an adhesive composition as described herein disposed on at least a portion of at least one of the first and second opposed major surfaces.

In some embodiments, the present disclosure provides a method of making an adhesive article, the method includes: forming an aqueous polymerizable pre-adhesive reaction mixture as described herein; polymerizing the monomers in the pre-adhesive reaction mixture to form a polymerized mixture; coating the polymerized mixture onto a support to form a coated mixture; and drying the coated mixture. Adhesive articles prepared by the methods are also described herein. In some embodiments, the article is a masking tape.

The terms "polymer" and "polymeric material" include, but are not limited to, organic copolymers, such as for example, block, graft (including starblock), random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries. The polymers can be homopolymers, copolymers, terpolymers, etc. Copolymer is used herein to encompass polymers made from two or more different monomers, including terpolymers, tetrapolymers, etc. The term polymer and/or copolymer is used regardless of the molecular weight and includes what is sometimes referred to as an oligomer.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "glass transition temperature" and "Tg" are used interchangeably. Typically Tg values are measured using Dynamic Mechanical Analysis (DMA), unless otherwise noted.

The term "room temperature" refers to ambient temperature, generally 20-22° C., unless otherwise noted.

The terms "high Tg nonionic monomer" and "high Tg nonionic monomeric unit" refer to a monomer or monomeric unit that has a glass transition temperature of at least 30° C., at least 40° C., or at least 50° C. when homopolymerized.

The terms "low Tg nonionic monomer" and "low Tg nonionic monomeric unit" refer to a monomer or monomeric unit that has a glass transition temperature no greater than 20° C., no greater than 10° C., or no greater than 0° C. when homopolymerized. The glass transition temperature is often no greater than −10° C. or −20° C.

The term "parts per hundred" or "pph" refers to parts per one hundred parts total monomers or polymer, which would be clearly understood depending on the context.

The term "(meth)acrylate" refers to monomeric acrylic or methacrylic esters of alcohols. Acrylate and methacrylate monomers are referred to collectively herein as "(meth) acrylates". Polymers described as being "(meth)acrylate-based" are polymers or copolymers prepared primarily (greater than 50% by weight (wt-%), greater than 60 wt-%, greater than 70 wt-%, greater than 80 wt-%, greater than 90 wt-%, greater than 95 wt-%, or 100 wt-%) from (meth) acrylate monomers and may include additional ethylenically unsaturated monomers such as various (meth)acrylamide monomers or various vinyl monomers that do not have a (meth)acryloyl group.

As used herein, the term "cationic polymer" or similar terms means a polymer having at least one cationic moiety covalently bonded within a polymer chain, substantially in the absence of anionic moieties also covalently bonded within the polymer chain. The cationic moieties are suitably disposed within the polymer backbone, are pendant to the polymer backbone, or a mixture thereof. In some embodiments, there is a single cationically functional monomeric unit covalently bonded within the cationic polymer; in other embodiments there is more than one cationic moiety covalently bonded within the cationic polymer. In some embodiments, there are one or more nonionic moieties covalently bonded within the cationic polymer. In some embodiments the cationic moieties are randomly distributed within a polymer chain; in other embodiments the cationic moieties are present in an alternating pattern, a blocky pattern, or another regular or semi-regular pattern within the polymer chain. The cationic polymer is typically a (meth)acrylate-based polymer.

As used herein, the term "zwitterionic polymer" or similar terms means a polymer having at least one anionic moiety and at least one cationic moiety covalently bonded within a single polymer chain. The anionic and cationic moieties are suitably disposed within the polymer backbone, are pendant to the polymer backbone, or a mixture thereof. In some embodiments, the anionic and cationic moieties are present on the same backbone or pendant unit. In some embodiments the anionic and cationic moieties are present on different backbone or pendant units. In some embodiments the anionic and cationic moieties are randomly distributed within a polymer chain; in other embodiments the anionic and cationic moieties are present in an alternating pattern, a blocky pattern, or another regular or semi-regular pattern within the polymer chain. In some embodiments, the anionic and cationic moieties are present in a 1:1 molar ratio within the polymer chain. In other embodiments, the anionic moieties are present in a molar excess relative to the cationic moieties within the polymer chain. In still other embodiments, the cationic moieties are present in a molar excess relative to the anionic moieties within the polymer chain. In some embodiments, there is a single anionically functional monomeric unit covalently bonded within the zwitterionic polymer; in other embodiments, there is more than one anionically functional monomeric unit covalently bonded within the zwitterionic polymer. In some embodiments, there is a single cationically functional monomeric unit covalently bonded within the zwitterionic polymer; in other embodiments, there is more than one cationically functional monomeric unit covalently bonded within the zwitterionic polymer. In some embodiments, there are one or more nonionic moieties covalently bonded within the zwitterionic polymer. The zwitterionic polymer is typically a (meth) acrylate-based polymer.

As used herein, the terms "polymerizable" or "curable" are applied to the compounds, also called "monomers", that are polymerizable and/or crosslinkable as a result of initiation by thermal decomposition, redox reaction, or photolysis. Such compounds have at least one alpha, beta-unsaturated site (i.e., an ethylenically unsaturated site). In some embodiments, monomers having more than one alpha, beta-unsaturated site are termed "crosslinkers" but it will be understood that the term "monomer" includes, as appropriate in context, compounds having more than one such site.

As used herein, the term "adhesive composition" or like term includes (1) a cationic polymer or a zwitterionic polymer, (2) a phenolic resin, and (3) optionally one or more additional components blended therewith, wherein the adhesive composition is typically a pressure sensitive adhesive composition.

As used herein, the term "adhesive article" means a support having an adhesive composition coated thereon. Supports are any useful material capable of having the adhesive compositions coated thereon for use in a pressure sensitive adhesive application. An adhesive article may be a masking article, though it is not a requirement that the adhesive article be used in a masking application. Adhesive articles include adhesive tapes, which can be used as a masking tape.

As used herein, the term "masking" means substantially preventing one or more liquids or liquid-borne materials from penetrating the interface of the adhesive composition and a substrate onto which an adhesive article is applied. As used herein in context with a masking application, the substrate onto which the adhesive article is applied is a "masked substrate". As used herein in context with a masking application, the portion of the substrate surface covered by the adhesive article and in contact with the adhesive composition is the "masked surface". Masking is achieved when one or more liquids or liquid-borne materials applied to the masked substrate are substantially prevented from contacting the masked surface.

As used herein, the term "substantial" or "substantially" means with relatively minor fluctuations or aberrations from the stated property, value, range of values, content, formula, and the like, and does not exclude the presence of additional materials, broader range values, and the like which do not materially affect the desired characteristics of a given composition, article, product, or method.

Herein, the terms "comprises" and "includes" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one". The phrases "at least one of" and "includes at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly". As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides adhesive compositions that include a cationic or zwitterionic polymer plus a phenolic resin. Aqueous polymerizable pre-adhesive reaction mixtures (also referred to as "aqueous pre-adhesive reaction mixtures" or "pre-adhesive reaction mixture" or "polymerizable pre-adhesive reaction mixtures" or like term) are also provided that include water, the monomer composition used to form the cationic or zwitterionic polymer, and a phenolic resin. The monomer composition contains one or more cationic (meth)acrylate monomers, one or more nonionic (meth)acrylate monomers, and optionally one or more anionic (meth)acrylate monomers. Further, the polymerized products of the pre-adhesive reaction mixtures are provided as well as methods of preparation of the adhesive compositions are provided wherein the cationic or zwitterionic polymers are formed in the presence of the phenolic resin.

Cationic polymers of the disclosure are copolymers including the reaction product of polymerizable monomers, in particular, one or more cationic monomers and one or more nonionic monomers. Zwitterionic polymers of the disclosure are copolymers including the reaction product of polymerizable monomers, in particular, one or more cationic monomers, one or more low Tg nonionic monomers having a (meth)acryloyl group, and one or more anionic monomers. The cationic polymers and the zwitterionic polymers are typically (meth)acrylate-based polymers.

The pre-adhesive reaction mixtures, the polymerized products of the pre-adhesive reaction mixtures, and the adhesive compositions of the present disclosure include one or more phenolic resins. The phenolic resin can be referred to as being "internally incorporated", which means that the phenolic resin is included in the polymerizable pre-adhesive reaction mixture and is present during the polymerization of the monomers used to form the cationic or zwitterionic polymer. Such phenolic resins may function as tackifiers in the resulting adhesive compositions.

Tackifiers are used as rheology modifiers in adhesive compositions to introduce more tack and better peel performance by lowering the modulus of the adhesive and increasing the overall thermal glass transition (Tg). Depending on the type of tackifier, they could also impart an advantageous surface chemistry which increases the adhesion to desired substrates. For example, terpene phenolic resin tackifiers have been found to increase adhesion to the difficult-to-stick-to paints by incorporation into rubber based adhesives.

The aqueous polymerizable pre-adhesive reaction mixtures are emulsions. The use of tackifiers in water-based emulsion polymer adhesives is generally limited to the use of dispersion-type tackifiers added after the polymerization of monomers. There are only a few commercially available dispersion tackifiers; however, they suffer from incompatibility problems (as evidenced by coagulum formation) with certain cationic and zwitterionic emulsion polymer adhesives. To overcome this problem, a mini-emulsion process can be used to make an adhesive by dissolving a tackifier with monomers to prepare adhesives; however, such processes require a high shear process step.

Surprisingly, incorporating phenolic resins into polymerizable pre-adhesive reaction mixtures that include cationic monomers solves the incompatibility problems. Furthermore, the resultant polymer adhesives are typically advantageous in that there are fewer problems with changing the color or sheen of a painted surface. An additional benefit of incorporating phenolic resins into polymerizable pre-adhesive reaction mixtures is the ability to use lower amounts of phenolic resins to achieve notable changes in adhesion performance, compared to typical loadings of phenolic resins in pre-made adhesive polymers (i.e., those in which the phenolic resin is added after the polymerization of the monomers). It is believed that this is because less of the phenolic resin leaches out of the adhesive as a result of the phenolic resin being internally incorporated within the adhesive composition. Use of the phrase "internally incorporated within the adhesive" means the phenolic resin was present in a polymerizable pre-adhesive reaction mixture during the polymerization of the monomers to form the polymerized product of the pre-adhesive reaction mixture. Although not intending to be limiting, the phenolic resin may be present in the adhesive composition, for example, by being bound in the adhesive polymer (the cationic or zwitterionic polymer), encapsulated or trapped in an interpenetrating network, and/or otherwise incorporated within the adhesive composition.

This internal incorporation of a phenolic resin can be accomplished by adding the phenolic resin to a monomer mixture that includes one or more cationic monomers, one or more nonionic monomers, and optionally one or more anionic monomers. The phenolic resin forms a dispersed phase (i.e., droplets) with the hydrophobic (meth)acrylate monomer(s) within water plus the ionic monomer(s). The low Tg nonionic monomers are hydrophobic (meth)acrylate monomers. Stated differently, the aqueous phase includes water, cationic monomer(s) and optional anionic monomer(s) dissolved in water while the dispersed phase include hydrophobic (meth)acrylate monomers (the nonionic low Tg monomers) and phenolic resin. The resultant aqueous polymerizable pre-adhesive reaction mixture is an emulsion, which is typically an aqueous dispersion.

Such phenolic resins may or may not function as tackifiers. The internal incorporation of phenolic resins is also advantageous because a wider variety of such resins may be used without the problems of incompatibility of such resins in an aqueous dispersion when added after the adhesive polymer (i.e., the cationic or zwitterionic polymer) is made. For example, certain phenolic resins are not available commercially as aqueous dispersions. Use of such resins is limited when added to a pre-made adhesive polymer. The present disclosure can make use of such resins that are not available as an aqueous dispersion by incorporating them into a polymerizable pre-adhesive reaction mixture. Thus, a wider variety of phenolic resins can be used in the present disclosure, thereby providing more formulation latitude as well as greater control and tunability of properties of the final product.

Cationic Monomers

Cationic monomers include (meth)acrylate esters having an alkyl ammonium functionality such as trialkyl ammonium functionality. In some embodiments, the cationic monomer is a 2-(trialkyl ammonium)ethyl acrylate or a 2-(trialkyl ammonium)ethyl methacrylate. In such embodiments, the nature of the alkyl groups is not particularly limited; however, cost and practicality limit the number of useful and/or available monomers. In some embodiments, the 2-(trialkyl ammonium)ethyl acrylate or 2-(trialkyl ammonium)ethyl methacrylate is formed from the reaction of 2-(dimethylamino)ethyl acrylate or 2-(dimethylamino)ethyl methacrylate with an alkyl halide; in such embodiments, at least two of the three alkyl groups of the 2-(trialkyl ammonium)ethyl acrylate or 2-(trialkyl ammonium)ethyl methacrylate are methyl. In some embodiments, all three alkyl groups are methyl groups. In other embodiments, two of the three alkyl groups are methyl and the third is a linear, branched, cyclic, or alicyclic group having from 2 to 24 carbon atoms, or from 6 to 20 carbon atoms, or from 8 to 18 carbon atoms, or 16 carbon atoms. In some embodiments, the cationic monomer is a mixture of two or more of these compounds.

The anion associated with the ammonium functionality in such cationic monomers is not particularly limited, and many anions are useful in connection with various embodiments of the disclosure. In some embodiments, the anion is a halide anion, such as chloride, bromide, fluoride, or iodide; in some such embodiments, the anion is chloride. In other embodiments the anion is $BF_4^-$, $N(SO_2CF_3)_2^-$, $O_3SCF_3^-$, or $O_3SC_4F_9^-$. In other embodiments, the anion is methyl sulfate. In still other embodiments, the anion is hydroxide. In some embodiments, the one or more cationic monomers includes a mixture of two or more of these anions.

In some embodiments, the cationic monomer(s) are present in the pre-adhesive reaction mixture in an amount of at least 2 weight percent (wt-%), or at least 4 wt-%, or at least 6 wt-%, or at least 7 wt-%, based on the total weight of the monomers in the pre-adhesive reaction mixture. In some embodiments, the cationic monomer(s) are present in the pre-adhesive reaction mixture in an amount of up to 45 wt-%, or up to 40 wt-%, or up to 35 wt-%, or up to 25 wt-%, or up to 15 wt-%, or up to 10 wt-%, based on the total weight of the monomers in the pre-adhesive reaction mixture. Various intermediate levels are also possible, such as 3 wt-%, 5 wt-%, 6 wt-%, 8 wt-%, and all other such individual values represented by, for example, 1 wt-% increments between 2 wt-% and 45 wt-%, and in any range spanning these individual values in, for example, 1 wt-% increments, such as 2 wt-% to 4 wt-%, 7 wt-% to 38 wt-%, 20 wt-% to 25 wt-%, and the like. These amounts also apply to the amounts of reacted monomeric units in a cationic or zwitterionic polymer of the present disclosure, wherein the weight percentages are based on the weight of the polymer.

The cationic monomer is typically dissolved in the water included in the aqueous polymerizable pre-adhesive reaction mixture.

Low Tg Nonionic Monomers Having a (Meth)Acryloyl Group

Suitable low Tg nonionic monomers are those with a (meth)acryloyl group (i.e., a single (meth)acryloyl group). These monomers are typically alkyl (meth)acrylates. More specifically, they are often alkyl acrylates having a non-tertiary alkyl group with 1 to 18 carbon atoms. These monomers are often added to lower the glass transition temperature of the cationic or zwitterionic polymer so that it functions as a pressure sensitive adhesive. The low Tg nonionic monomers typically are not soluble in water or have very limited solubility in water.

Specific examples of low Tg nonionic monomers having a (meth)acryloyl group include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

In some embodiments, the low Tg nonionic monomers having a (meth)acryloyl group are present in the pre-adhesive reaction mixture in an amount of at least 10 wt-%, at least 20 wt-%, at least 25 wt-%, at least 30 wt-%, at least 35 wt-%, at least 40 wt-%, at least 45 wt-%, at least 50 wt-%, at least 55 wt-%. at least 60 wt-%, at least 65 wt-%, at least 70 wt-%, at least 75 wt-%, or at least 80 wt-%, based on a total weight of monomers in the pre-adhesive reaction mixture. In some embodiments, the low Tg nonionic monomers having a (meth)acryloyl group are present in the pre-adhesive reaction mixture in an amount of up to 98 wt-%, up to 95 wt-%, up to 90 wt-%, or up to 85 wt-%, based on a total weight of monomers in the pre-adhesive reaction mixture. These amounts also apply to the amounts of reacted monomeric units in a cationic or zwitterionic polymer of the present disclosure, wherein the weight percentages are based on the weight of the polymer.

Anionic Monomers

For preparation of zwitterionic polymers, anionic monomers are included in the polymerizable pre-adhesive reaction mixture.

Anionic monomers include, but are not limited to, acrylic acid, methacrylic acid, a salt thereof, or a blend thereof. In some embodiments, the anionic monomers include acrylic acid, methacrylic acid, a carboxylate salt thereof, or a mixture of two or more thereof, wherein the amount of carboxylate salt is determined based on the weight of the corresponding free acid.

Other anionic monomers include itaconic acid, maleic acid, beta-carboxyethyl acrylate, sulfoethyl (meth)acrylate, sulfopropyl (meth)acrylate, vinyl phosphoric acid, and 2-acrylamido-2-methylpropane sulfonic acid, and salts thereof.

Anionic monomers are not used in making purely cationic polymers. Thus, in certain embodiments, the amount present in the pre-adhesive reaction mixture can be 0 to 5 wt-%, based on the total weight of the monomers in the pre-adhesive reaction mixture.

When the anionic monomers are present in making zwitterionic polymers, in some embodiments, the anionic monomer(s) are present in the pre-adhesive reaction mixture in an amount of at least 0.2 wt-%, or at least 0.5 wt-%, based on the total weight of the monomers in the pre-adhesive reaction mixture. In some embodiments, the anionic monomer(s) are present in the pre-adhesive reaction mixture in an amount of up to 5 wt-%, based on the total weight of the monomers in the pre-adhesive reaction mixture. Various intermediate levels are also possible, such as 0.3 wt-%, 0.4 wt-%, 0.6 wt-%, 0.7 wt-%, and all other such individual values represented by 0.1 wt-% increments between 0.2 and 5 wt-%, and in any range spanning these individual values in, for example, 0.1 wt-% increments, such as 0.2 wt-% to 0.9 wt-%, 1.2 wt-% to 3.1 wt-%, and the like. These amounts also apply to the amounts of reacted monomeric units in a zwitterionic polymer of the present disclosure, wherein the weight percentages are based on the weight of the polymer.

The anionic monomer is typically dissolved in the water along with the cationic monomer included in the polymerizable pre-adhesive reaction mixture.

Additional Optional Monomers

In some embodiments, the aqueous polymerizable pre-adhesive reaction mixtures may include one or more additional monomers. Such additional monomers are not particularly limited by structure, but are selected to impart to the resulting polymer (cationic or zwiterionic) various desirable properties. For cationic polymers, it is understood that such additional optional monomers are not anionic.

In some embodiments, the additional monomer(s) are selected to provide a reduced level of measurable adhesion to a selected substrate while still providing the level of tack of the adhesive polymer (i.e., the cationic or zwitterionic polymer), relative to the adhesive polymer without the one or more additional monomers. In other embodiments, the additional monomer(s) are selected to impart to the resulting adhesive polymer with a reduced level of tack while maintaining a substantially constant level of adhesion to a selected substrate, relative to the polymer without the one or more additional monomers. In still other embodiments, the additional monomer(s) are selected to impart to the resulting adhesive polymer an increased level of tack while maintaining a substantially constant level of adhesion to a selected substrate relative to the adhesive polymer without the one or more additional monomers.

In many embodiments, the additional optional monomers are selected from a) one or more high Tg nonionic monomers having a (meth)acryloyl group (i.e., a single (meth)acryloyl group), b) one or more polar monomers having a polar group that is a hydroxyl group, primary amido group, secondary amido group, a tertiary amido group, an amino group, an ether group, or an epoxy group, c) one or more vinyl monomers that are free of a (meth)acryloyl group, or d) a mixture of two or more thereof.

In many embodiments, the optional additional monomers include one or more high Tg nonionic monomers having a (meth)acryloyl group. When used in combination with one or more hydrocarbon tackifiers described herein, such high Tg nonionic monomers have been found to increase adhesion to low surface energy substrates (LSE's), particularly polyolefins (e.g., low or high density polyethylenes, polypropylenes), polycarbonates, fluoroplastics, and engineering thermoplastics used, for example, in automobiles (e.g., bumpers), as well as other surfaces, such as glass.

Example high Tg nonionic monomers having a single (meth)acryloyl group include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, and mixtures thereof.

The optional polar monomers are not the anionic monomer or cationic monomers described above. Rather, the polar monomers have a polar group that is a hydroxyl group, primary amido group, secondary amido group, a tertiary amido group, an amino group, an ether group, or an epoxy group. One or more different polar monomers can be used.

Example polar monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., hydroxymethyl (meth)acrylamide, 2-hydroxyethyl (meth)acrylamide, 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Example polar monomers with a primary amido group include (meth)acrylamide.

Example polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth) acrylamide, N-octyl (meth)acrylamide, and diacetone (meth)acrylamide.

Example polar monomers with a tertiary amido group include caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Example polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth) acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth) acrylate, N,N-diethylaminoethyl (meth)acrylamide, N,N-diethylaminopropyl (meth)acrylate, and N,N-diethylaminopropyl (meth)acrylamide.

Example polar monomers with an epoxy group would include glycidyl (meth)acrylate.

Example polar monomers with a ether group would include 2-methoxyethyl acrylate and methoxy polyethylene glycol (meth)acrylate.

Optional vinyl monomers are monomers that do not have a (meth)acryloyl group. Vinyl monomers having a polar group characteristic of polar monomers are considered herein to be polar monomers. Example vinyl monomers include, but are not limited to, acrylonitrile, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof.

In some embodiments, the one or more additional optional monomers, particularly one or more high Tg nonionic monomers having a (meth)acryloyl group, may be present in a pre-adhesive reaction mixture in an amount of greater than 0 wt-%, or at least 1 wt-%, or at least 2 wt-%, or at least 3 wt-%, or at least 5 wt-%, based on the total weight of the monomers in the pre-adhesive reaction mixture. In some embodiments, the one or more additional monomers may be present in a pre-adhesive reaction mixture in an amount of up to 30 wt-%, or up to 20 wt-%, or up to 15 wt-%, or up to 10 wt-%, based on the total weight of the monomers in the pre-adhesive reaction mixture. Various intermediate levels are also possible, such as 1 wt-%, 3 wt-%, 4 wt-%, 5 wt-%, 6 wt-%, 7 wt-%, and all other such individual values represented by, for example, 1 wt-% increments between 0 wt-% and 30 wt-%, and in any range spanning these individual values in, for example, 1 wt-% increments, such as 2 wt-% to 4 wt-%, 11 wt-% to 28 wt-%, 7 wt-% to 17 wt-%, and the like. These amounts also apply to the amounts of reacted monomeric units in a cationic or zwitterionic polymer of the present disclosure, wherein the weight percentages are based on the weight of the polymer.

Depending on the solubility of these monomers in water, the optional additional monomers can be dissolved in water, dispersed in water, or both.

Optional Crosslinking Monomers

In some embodiments, the polymerizable pre-adhesive reaction mixture includes an optional additional monomer having two or more polymerizable functionalities; such monomers are referred to as crosslinkers. Crosslinkers that are useful in forming the cationic or zwitterionic polymer include, without limitation, diacrylates such as ethylene glycol diacrylate, hexanediol diacrylate, and tripropyleneglycol diacrylate; triacrylates such as glycerol triacrylate and trimethylolpropane triacrylate; tetraacrylates such as erythritol tetraacrylate and pentaerythritol tetraacrylate; divinyl benzene and derivatives thereof; and the like. In some embodiments, the crosslinker is a photoactive crosslinker. Photoactive crosslinkers include, for example, benzaldehyde, acetaldehyde, anthraquinone, substituted anthraquinones, various benzophenone-type compounds such as copolymerizable benzophenones (e.g., acryloyl benzophenone (ABP)), and certain chromophore-substituted vinylhalomethyl-1,3-triazines such as 2,4-bis(trichloromethyl)-6-p-methoxystyryl-1,3-triazine.

In some embodiments, one or more crosslinkers (i.e., crosslinking monomers), as an additional monomer, are present in a pre-adhesive reaction mixture in an amount of up to 10 wt-%, up to 5 wt-%, or up to 2 wt-%, based on the total weight of the monomers in the pre-adhesive reaction mixture. In some embodiments, the one or more crosslinkers are present in a pre-adhesive reaction mixture in an amount of greater than 0 wt-%, at least 0.1 wt-%, at least 0.5 wt-%, or at least 1.0 wt-% based on the total weight of the monomers in the pre-adhesive reaction mixture. These amounts also apply to the amounts of reacted monomers used to form the cationic or zwitterionic polymer, wherein the weight percentages are based on the weight of the polymer.

Overall Monomer Composition in Pre-Adhesive Reaction Mixtures

In some embodiments, the cationic or zwitterionic polymer is formed from the following monomer composition:

2 wt-% to 45 wt-%, based on the total weight of monomers, of one or more cationic monomers comprising a (meth)acrylate ester having an alkyl ammonium functionality;

10 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt monomer, or a mixture of two or more thereof, wherein the amount of carboxylate salt is determined based on the weight of the corresponding free acid.

In some example embodiments, the cationic or zwitterionic polymer is formed from the following monomer composition:

2 wt-% to 20 wt-%, based on the total weight of monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg of no more than 20° C. when homopolymerized;

0 wt-% to 20 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In other example embodiments, the cationic or zwitterionic polymer is formed from the following monomer composition:

5 wt-% to 20 wt-%, based on the total weight of monomers, of one or more cationic monomers comprising a (meth)acrylate ester having an alkyl ammonium functionality;

60 wt-% to 95 wt-%, based on the total weight of monomers, of one or more low Tg nonionic monomers having a (meth)acryloyl group and having a Tg of no more than 20° C. when homopolymerized;

0 wt-% to 10 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 5 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer is formed from the following monomer composition:

5 wt-% to 15 wt-%, based on the total weight of monomers, of one or more cationic monomers comprising a (meth)acrylate ester having an alkyl ammonium functionality;

65 wt-% to 95 wt-%, based on the total weight of monomers, of one or more low Tg nonionic monomers having a (meth)acryloyl group and having a Tg of no more than 20° C. when homopolymerized;

0 wt-% to 10 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 5 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In yet other example embodiments where there are no optional additional monomers or optional crosslinking monomers, the cationic or zwitterionic polymer is formed from the following monomer composition:

2 wt-% to 20 wt-%, based on the total weight of the monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof; and 0 wt-% to 5 wt-%, based on the total weight of the monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

Phenolic Resins

Phenolic resins useful in the present disclosure include terpene phenolic resins, alkyl phenolic resins, or combinations thereof. Some phenolic resins may be characterized as tackifiers, and may function as tackifiers in the adhesives compositions of the present disclosure. For example, terpene phenolic resins may function as tackifiers in the adhesive compositions of the present disclosure.

One or more phenolic resins can be used in polymerizable pre-adhesive reaction mixtures, and the resultant adhesive compositions formed therefrom. It will be understood that "phenolic resin" or "phenolic group-containing resin" (or similar phrases used herein) can include blends of two or more such resins. Blends of two or more phenolic resins are useful in some embodiments herein. In some embodiments, the blends of phenolic resins include blends of resins differing solely in terms of molecular weight, degree of branching, or types of terpenes and/or phenolic compounds employed as starting materials to make the phenolic resins. In other embodiments, the blends of phenolic resins have more than one such difference.

Suitable terpene phenolic resins (i.e., terpene phenolic tackifiers, or terpene phenolics) have at least one aromatic group bearing at least one hydroxyl group bound directly to the aromatic group; and at least one branched alkyl or alkenyl group bonded directly to an aromatic group. In some embodiments, the branched alkyl or alkenyl group is derived from an oligomer of isoprene. In some embodiments, the terpene phenolic resin has a single aromatic group having one or more hydroxyl groups and one or more branched alkyl or alkenyl group bonded directly thereto. In other embodiments, the terpene phenolic resin has more than one aromatic group having one or more hydroxyl groups and one or more branched alkyl or alkenyl group bonded directly to one or more aromatic groups. In some embodiments, the terpene phenolic resin is nonreactive; in other embodiments, the terpene phenolic resin may be reactive (e.g., it may comprise one or more reactive groups).

Conventional methods may be employed to make the terpene phenolic resins. Some representative methods that are useful to form terpene phenolic resins include those described in U.S. Pat. No. 3,347,935 (Kaupp et al.), U.S. Pat. No. 3,692,844 (Hollis et al.); U.S. Pat. No. 3,976,606 (Gobran), U.S. Pat. No. 5,457,175 (Scharrer et al.) and U.S. Pat. No. 6,160,083 (Thompson et al.); and EP 1504074 (Deshpande et al.). In some embodiments, the terpene phenolic resins are 1:1 addition products of phenolic compounds with terpene compounds. In some such embodiments, the reaction is catalyzed by acidic or acid-forming catalysts. Using limonene and phenol as exemplary reagents for illustrative purposes only, the reaction proceeds via path a or path b below, typically resulting in a mixture of products A, B, C:

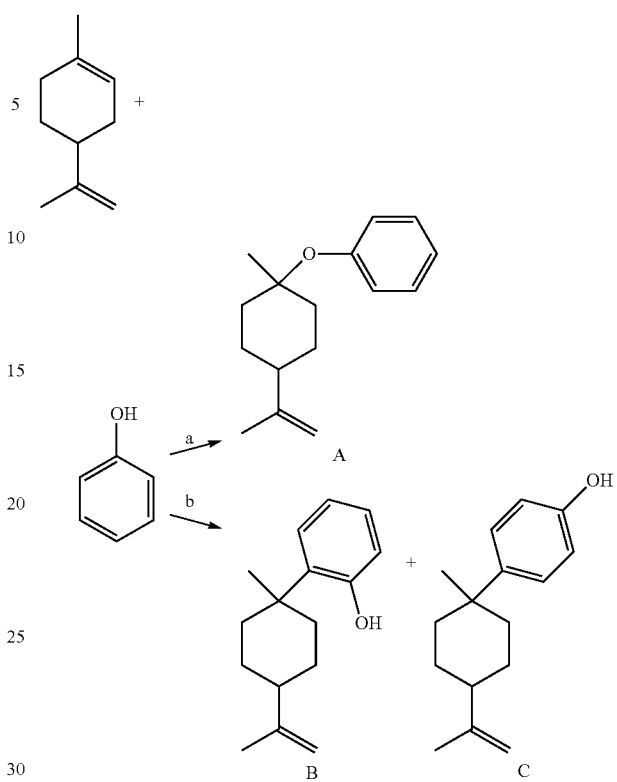

Compound A is an aromatic ether, while compounds B and C are modified phenolics. In many embodiments reaction path b favors formation of product C over product B. Only reaction path b results in residual hydroxyl functionality. The degree of selectivity of reaction path a over reaction path b, and thus the degree of hydroxyl functionality of the final product, is one factor that determines which terpene phenolic resins are useful in the adhesive compositions herein. It is important to note that a mixture of A, B, and C type products in a resin is acceptable; it is the total hydroxyl content of the resin, measured and expressed as the hydroxyl number, that is important for the phenolic resins useful herein.

In the reaction scheme pictured above, in some embodiments the reaction does not yield only the 1:1 addition reaction products as pictured. In some embodiments, two or more terpenes react with one phenolic compound. In other embodiments, two or more phenolic compounds react with one terpene. In embodiments where the phenolic compound has more than one site available for reaction with a terpene compound (in the case of phenol itself, there are 3 potential reactive sites), or where the terpene has more than one site available for reaction with a phenolic compound, X:Y phenolic compound:terpene compound reaction products can arise. For example, in some embodiments, reaction ratios 3:1, 2:1, 1:2, 1:3, or others can arise. This is particularly true where oligomeric phenolic compounds having multiple aromatic hydroxyls are employed as the phenolic compound starting material. In such embodiments, the relative amounts of 1:1, 1:2, or other reaction products present in a pre-adhesive reaction mixture, or in a blend formed after the reaction, may be expressed as an average phenolic: terpene reaction product ratio such as, e.g., 1:1.5, 1.7:1, 1:1.02, and the like. For the purposes of the terpene phenolic resins useful herein, such ratios are not particularly limited.

In some embodiments, the average phenolic:terpene reaction product ratio is from 2:1 to 1:2, or from 1.5:1 to 1:1.5.

In some embodiments, suitable terpene phenolic resins have weight average molecular weights of 200 g/mol to 3000 g/mol, or 200 g/mol to 1600 g/mol, or 250 g/mol to 1500 g/mol, or 300 g/mol to 1000 g/mol, or 300 g/mol to 800 g/mol, or 400 g/mol to 800 g/mol, or 500 g/mol to 700 g/mol. In some embodiments, terpene phenolic resins have a polydispersity of 1 to 3, or 1 to 2, or 1 to 1.5.

In some embodiments, terpene phenolic resins useful herein can have glass transition temperatures of 40° C. to 120° C., or 50° C. to 100° C. In some embodiments, terpene phenolic resins useful herein have softening points of 80° C. to 200° C., or 80° C. to 150° C., or 90° C. to 130° C., or 100° C. to 120° C., or 105° C. to 160° C., or 105° C. to 125° C., or 110° C. to 120° C., or 115° C., 130° C., or 160° C.

In various embodiments, terpene phenolic resins that are useful herein include those with an acid number that is very low. By way of example, in some embodiments, terpene phenolic resins useful herein can have an acid number of less than 0.5. In some embodiments, terpene phenolic resins useful herein can have an acid number of less than 0.25. In some embodiments, terpene phenolic resins useful herein can have an acid number of less than 0.1. In some embodiments, terpene phenolic resins useful herein can have an acid number of about 0. Acid number is the number of milligrams (mg) of potassium hydroxide (KOH) required to neutralize the acid functionality in a 1 gram (g) aliquot of the phenolic resin. Various methods are employed by the skilled practitioner to determine acid number. In one typical procedure, a known amount of the phenolic resin is dissolved in organic solvent is titrated with a solution of KOH of known concentration, employing phenolphthalein as a color indicator. Other acid number tests include ASTM D 974 and ASTM D664. Included in the definition of "about 0" is an acid number that is very close to 0, such as 0.05, in order to account for minimal amounts of impurities or error in the testing measurements.

The terpene phenolic resins can have a hydroxyl number of about 0 (such as for a nearly pure Compound A aromatic ether type reaction product shown above) to 220. In some embodiments, terpene phenolic resins that are useful herein include those with a hydroxyl number in the range of 20 to 220, or 50 to 220, or 100 to 220. The hydroxyl number is defined as the number of mg KOH corresponding to the hydroxyl functionality in a 1 g aliquot of the phenolic resin. Various methods are employed by the skilled practitioner to determine hydroxyl number. The most frequently described method is conversion of the sample with acetic acid anhydride in pyridine with subsequent titration of the released acetic acid (also described in ASTM D1957-86(2001) Standard Test Method for Hydroxyl Value of Fatty Oils and Acids (Withdrawn 2007)). Also widely employed is the method according to ASTM E 1899, wherein primary and secondary hydroxyl groups are converted with toluene-4-sulfonyl-isocyanate (TSI) into an acid carbamate, which is then titrated with tetrabutylammonium hydroxide (TBAH) in a non-aqueous medium.

In many embodiments, commercially available terpene phenolic resins are useful herein. Terpene phenolic resin tackifiers are sold, for example, by the Arizona Chemical Company of Jacksonville, Fla., USA under the trade name SYLVARES; by DRT of Cedex, France under the trade name DERTOPHENE; and by the Yasuhara Chemical Company, Ltd. of Hiroshima, Japan under the trade name POLYSTER. Specific terpene phenolic resin tackifiers can include, but are not limited to, SYLVARES TP 300, SYLVARES TP 7042, POLYSTER S145, POLYSTER TH130, POLYSTER UH115, DERTOPHENE 1510, and DERTOPHENE H150.

Suitable alkyl phenolic resins include para-alkylphenol-formaldehyde novolac resins. In some embodiments, the novolac resins are made from a p-alkylphenol wherein the p-alkyl group contains from 9 to 15 carbon atoms. Such phenol-formaldehyde resins are those produced through the acid catalyzed reaction of formaldehyde and an isomeric p-alkylphenol. Illustrative of such alkyl groups are isomeric nonyl groups, isomeric decyl groups, isomeric undecyl groups, isomeric dodecyl groups, isomeric tridecyl groups, isomeric tetradecyl groups, isomeric pentadecyl groups, and the like. By the terms alkyl group and mixtures as employed herein is meant those mixtures composed predominantly of branched chain p-alkyl groups and which contain less than 50 percent of any one straight chain alkyl groups.

The alkyl phenols which are useful in preparation of the phenol-formaldehyde resins may be prepared by condensing isomeric olefins containing from 9 to 15 carbon atoms and having one remaining unsaturated bond with phenol by conventional condensation reactions. Separation of the ortho-isomer, if desired, can be accomplished by distillation or other convenient means. However, small amounts of the ortho-isomer can be tolerated.

By way of illustration, isomeric propylene trimer (i.e., nonylene) containing one unsaturated bond is such a mixture of isomers having nine carbon atoms. It can be re acted with phenol to yield a mixture of ortho- and para-substituted nonylphenols, the para isomer being present in a major amount. The product is thus principally a mixture of isomeric p-nonylphenols. By the same method isomeric p-decylphenol can be produced by copolymerizing propylene with butylene and fractionating the decyl isomers before reacting with phenol; isomeric p-undecyl phenol can be prepared in the same manner but by varying the ratio of the olefins. Isomeric p-dodecyl phenol is prepared as the tetramer of propylene which is then condensed with phenol, and so forth. Other methods of preparation such as cracking higher molecular weight hydrocarbon, and the like can also be used and are well known in the art.

Suitable alkyl phenol-formaldehyde novolac resins useful herein may be prepared by known methods. This preparation can be accomplished by reacting at least 0.7 mole of formaldehyde per mole of alkyl phenol in the presence of an acidic catalyst. The alkylphenol and the formaldehyde reactants are generally condensed by reacting them at a temperature of from 20° C. to 150° C. in the presence of a catalytic amount of acid catalyst.

The inclusion of a phenolic resin can provide enhanced adhesion to at least some architectural coatings (e.g., various low-VOC paints), particularly under conditions of elevated humidity. Due to the wide variety of architectural coating compositions, such enhancement may not necessarily occur to the same degree for every architectural coating (alternatively phrased, different levels of phenolic resins, and/or phenolic resins of different composition, may be optimum for use with different architectural coatings).

In some embodiments, the phenolic resin is present in the pre-adhesive reaction mixture in an amount of at least 2 parts per one hundred parts of total monomers (pph), or at least 3 pph, or at least 4 pph, or at least 5 pph. In some embodiments, the phenolic resin is present in the reaction mixture in an amount of up to 30 pph, or up to 25 pph, or up to 20 pph, or up to 15 pph. Various intermediate levels are also possible, such as 3 pph, 6 pph, 7 pph, and all other such individual values represented by, for example, 1 pph increments between 2 pph and 20 pph, and in any range spanning these individual values in, for example, 1 pph increments, such as 2 pph to 4 pph, or 11 pph to 20 pph, or 5 pph to 10 pph, and the like.

Polymerization Processes

The polymerization of the cationic and zwitterionic polymers are carried out using conventional thermal polymerization techniques familiar to those of skill.

In the case of emulsion polymerization, water-soluble initiators are preferred. In some embodiments where thermal decomposition is employed to initiate polymerization, emulsion polymerization of the monomers employed to make the cationic or zwitterionic polymers of the disclosure is carried out by blending the monomers, phenolic resin(s), and a thermal initiator in water, followed by heating the emulsion to a temperature wherein decomposition of the initiator occurs at a rate suitable to sustain a suitable rate of polymerization. Non-limiting examples of suitable thermal initiators include any of the organic peroxides or azo compounds conventionally employed by those skilled in the art of thermal initiation of polymerization, such a dicumyl peroxide, benzoyl peroxide, or 2,2'-azo-bis(isobutyronitrile) (AIBN), and thermal initiators sold under the trade name VAZO by DuPont USA of Wilmington, Del. In the case of emulsion polymerization, water-soluble initiators are preferred. The amount of initiator is typically in a range of 0.05 to 2 wt-% or in a range of 0.1 to 1 wt-%, or in a range of 0.1 to 0.5 wt-% based on the total weight of monomers.

The pre-adhesive reaction mixture often contains a chain transfer agent to control the molecular weight of the resulting cationic or zwitterionic monomer. Exemplary chain transfer agents include, but are not limited to, carbon tetrabromide, carbon tetrachloride, mercaptans such as tert-dodecyl mercaptan, n-dodecyl mercaptan, n-octyl mercaptan, 1,8-dimercapto-3,6-dioxaoctane, 2-mercaptoethanol, trimethylolpropane tris(3-mercapto propionate), pentaerythritol tetra(3-mercapto propionate), 3-mercaptoproprionic acid, isooctyl 3-mercapto proprionate, and mixtures thereof.

In some embodiments, the amount of the chain transfer agent is present in the pre-adhesive reaction mixture in an amount of at least 0.001 part per one hundred parts total monomers (pph), or at least 0.005 pph, or at least 0.01 pph, or at least 0.05 pph, or at least 0.1 pph. In some embodiments, the amount of the chain transfer agent is present in the pre-adhesive reaction mixture in an amount of up to 2 pph, or up to 1 pph.

In some embodiments, the monomers and phenolic resin(s) are admixed, coated onto a tape backing or other support, and heated to initiate polymerization. In some such embodiments, air is partially excluded or limited in the reaction area during the polymerization.

In some embodiments, one or more additional monomers, crosslinkers, initiators, chain transfer agents, or a combination thereof are then added to the pre-polymerized mixture of monomers and phenolic resin(s). In some embodiments, the one or more additional monomers, crosslinkers, initiators, chain transfer agents, or combination thereof include some or all of the same compounds, present in the same ratios, as those added to the mixture that is pre-polymerized. The pre-polymerized mixture is then coated onto the support and cured, wherein the viscosity of the pre-polymerized mixture allows a thicker layer to be coated than would be practicable by coating without pre-polymerization.

In other embodiments, an emulsion of monomers and phenolic resin(s) is formed and polymerization is carried out using thermal initiation of the polymerization reaction. The emulsion is a water-in-oil or an oil-in-water emulsion. In some such embodiments, the emulsion is an oil-in-water emulsion, wherein the one or more monomers are stabilized in a bulk water phase by employing one or more surfactants. In various embodiments, the surfactant is cationic, zwitterionic, or nonionic in nature and the structure thereof not otherwise particularly limited. In some embodiments, the surfactant is also a monomer and becomes incorporated within the cationic or zwitterionic polymer molecules. In other embodiments, the surfactant is present in the polymerization reaction vessel but is not incorporated into the cationic or zwitterionic polymer as a result of the polymerization reaction.

Non-limiting examples of nonionic surfactants useful in forming oil-in-water emulsions of the monomers and phenolic resin(s) employed to form a cationic or zwitterionic polymer include block copolymers of ethylene oxide and propylene oxide, such as those sold under the trade names PLURONIC, KOLLIPHOR, or TETRONIC, by the BASF Corporation of Charlotte, N.C., USA; ethoxylates formed by the reaction of ethylene oxide with a fatty alcohol, nonylphenol, dodecyl alcohol, and the like, including those sold under the trade name TRITON, by the Dow Chemical Company of Midland, Mich., USA; oleyl alcohol; sorbitan esters; alkylpolyglycosides such as decyl glucoside; sorbitan tristearate; and combinations of one or more thereof.

Non-limiting examples of cationic surfactants useful in forming oil-in-water emulsions of the monomers and phenolic resin(s) employed to form a cationic or zwitterionic polymer include cocoalkylmethyl[polyoxyethylene (15)] ammonium chloride, benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N.V. of Amsterdam, the Netherlands, under the trade names ETHOQUAD, ARQUAD, and DUO-QUAD; and mixtures thereof. Of particular use in forming oil-in-water emulsions for polymerization of the zwitterionic polymers of the disclosure are the ETHOQUAD surfactants, for example, ETHOQUAD C/12, C/25, C/12-75, and the like. In some embodiments, ETHOQUAD C/25 is usefully employed to make high solids emulsions in water of the monomers employed to make the zwitterionic polymers of the disclosure.

In some embodiments, where a cationic surfactant is employed in an oil-in-water emulsion polymerization reaction, it is employed in an amount of at least 0.1 wt-%, or at least 0.2 wt-%, or at least 0.5 wt-%, or at least 1.0 wt-%, or at least 2.0 wt-%, based on the total weight of the monomers in the pre-adhesive reaction mixture. In some embodiments where a cationic surfactant is employed in an oil-in-water emulsion polymerization reaction, it is employed in an amount of up to 6.0 wt-%, or up to 4.0 wt-%, based on the total weight of the monomers in the pre-adhesive reaction mixture. Various intermediate levels are also useful, such as 1.1 wt-%, 1.2 wt-%, 1.3 wt-%, 1.4 wt-%, 1.5 wt-%, 1.6 wt-%, 1.7 wt-%, 1.8 wt-%, 1.9 wt-%, 2.1 wt-%, 2.2 wt-%, and all other such individual values represented by, for example, 0.1 wt-% increments between 0.1 and 6.0 wt-%, and in any range spanning these individual values in, for example, 0.1 wt-% increments, such as 2.3 wt-% to 4.6 wt-%, 4.5 wt-% to 4.7 wt-%, and the like.

Non-limiting examples of zwitterionic surfactants useful in forming oil-in-water emulsions of the monomers employed to form the cationic or zwitterionic polymers include betaines and sultaines, such as cocamidopropyl betaine, hydroxysultaine, and cocamidopropyl hydroxysultaine; others include lecithin, 3-[(3-cholamidopropyl)dimethylammonio]-1-propanesulfonate (CHAPS), and sodium 2-[1-(2-hydroxyethyl)-2-undecyl-4,5-dihydroimidazol-1-ium-1-yl]acetate (sodium lauroamphoacetate).

In some embodiments, where a zwitterionic surfactant is employed in an oil-in-water emulsion polymerization reaction, it is employed in an amount of at least 1.0 wt-%, or at least 2.0 wt-%, based on the total weight of the monomers in the pre-adhesive reaction mixture. In some embodiments, where a zwitterionic surfactant is employed in an oil-in-water emulsion polymerization reaction, it is employed in an amount of up to 10.0 wt-%, or up to 6.0 wt-%, based on the total weight of the monomers in the pre-adhesive reaction mixture. Various intermediate levels are also useful, such as 1.1 wt-%, 1.2 wt-%, 1.3 wt-%, 1.4 wt-%, 1.5 wt-%, 1.6 wt-%, 1.7 wt-%, 1.8 wt-%, 1.9 wt-%, 2.1 wt-%, 2.2 wt-%, and all other such individual values represented by, for example, 0.1 wt-% increments between 1.0 and 10.0 wt-%, and in any range spanning these individual values in, for example, 0.1 wt-% increments, such as 2.3 wt-% to 4.6 wt-%, 4.5 wt-% to 4.7 wt-%, and the like.

In other embodiments, emulsion polymerization of the monomers and phenolic resin(s) employed to make a cationic or zwitterionic polymer of the disclosure is carried out by blending the monomers, and phenolic resin(s), surfactant(s), and a thermal initiator in water, followed by heating the emulsion to a temperature where decomposition of the thermal initiator is induced at a suitable rate.

In some embodiments where methacrylic acid or acrylic acid are employed in the monomer mixture, sodium, lithium, ammonium, or potassium hydroxide is added to the monomer mixture to neutralize the acid functionality and form the corresponding salt. In other embodiments, such neutralization is carried out after completion of the polymerization reaction. Neutralization, in embodiments, means adjusting the pH of the water phase from 2 to 3 to 4 to 7, for example, 5 to 6.

In some embodiments, ETHOQUAD C/25, which is cocoalkylmethyl[polyoxyethylene (15)] ammonium chloride, is usefully employed to make high solids emulsions of the monomers and phenolic resin(s). In this context, "solids" are defined as all ingredients of the emulsion other than water.

In some embodiments, high solids emulsions are formed, for example, at a solids content of at least 15 wt-%, or at least 25 wt-%, or at least 30 wt-%, solids in water. In some embodiments, high solids emulsions are formed, for example, at a solids content of up to 60 wt-%, or up to 50 wt-%, solids in water. Various intermediate levels are useful, such as 16 wt-%, 17 wt-%, 18 wt-%, 19 wt-%, 20 wt-%, 21 wt-%, 22 wt-%, 23 wt-%, 24 wt-%, 26 wt-%, 27 wt-%, and all other such individual values represented by, for example, 1 wt-% increments between 15 wt-% and 60 wt-% solids in water, and in any range spanning these individual values in, for example, 1 wt-% increments, such as 23 wt-% to 46 wt-%, 45 wt-% to 57 wt-%, and the like.

In some embodiments, water is present in the polymerizable pre-adhesive reaction mixture, for example, in an amount of at least 40 wt-%, or at least 45 wt-%, or at least 50 wt-%. In some embodiments, water is present in the polymerizable pre-adhesive reaction mixture, for example, in an amount of up to 85 wt-%, or up to 75 wt-%, or up to 70 wt-%, or up to 60 wt-%.

In general, conditions of emulsion polymerization and methodology employed are the same or similar to those employed in conventional emulsion polymerization methods. In some embodiments, the oil-in-water emulsion polymerization is carried out using thermal initiation. In such embodiments, one useful polymerization initiator is V-50, which is a water-soluble cationic azo initiator (obtained from Wako Pure Chemical Industries Ltd. of Osaka, Japan). In some such embodiments, the temperature of the emulsion is adjusted prior to and during the polymerization to 30° C. to 100° C., or 40° C. to 80° C., or 40° C. to 60° C., or to 45° C. to 55° C.

Agitation of the emulsion at elevated temperature is carried out for a suitable amount of time to decompose substantially all of the thermal initiator, and react substantially all of the monomers added to the emulsion to form a polymerized emulsion. In some embodiments, elevated temperature is maintained for a period of 2 hours to 24 hours, or 4 hours to 18 hours, or 8 hours to 16 hours.

During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques, such as gas chromatographic analysis of residual monomer content, will inform the skilled artisan regarding the completion of polymerization.

In other embodiments, the polymerization occurs in an aqueous mixture that may also include an organic solvent. Examples of suitable organic solvents and solvent mixtures include, in various embodiments, one or more of ethanol, methanol, toluene, methyl ethyl ketone, ethyl acetate, isopropyl alcohol, tetrahydrofuran, 1-methyl-2-pyrrolidinone, 2-butanone, acetonitrile, dimethylformamide, dimethyl sulfoxide, dimethylacetamide, dichloromethane, t-butanol, methyl isobutyl ketone, methyl t-butyl ether, and ethylene glycol. If used, no more than 10 wt-% organic solvent is used in the pre-adhesive reaction mixtures described herein.

Adhesive Compositions and Coating

The adhesive compositions of the disclosure include at least one cationic polymer or zwitterionic polymer, one or more phenolic resins incorporated therein, and optionally one or more additional components. Additional components include one or more adhesion promoters, surfactants, antifouling agents, thermal or oxidative stabilizers, colorants, adjuvants, plasticizers, solvents, crosslinkers, or mixtures thereof.

In some embodiments, an emulsified cationic or zwitterionic polymer having one or more phenolic resin(s) incorporated therein, at the end of an emulsion polymerization process, is employed as the adhesive composition and is coated as-is onto one or more supports to form a masking article. In such embodiments, water and one or more surfactants employed in the polymerization will remain associated with the adhesive composition, along with any residual unreacted monomers or initiators. The adhesive composition is coated and dried for a period of time sufficient to remove a substantial portion of the water, but in most embodiments the surfactant(s) employed will remain in the dried coating whether or not such surfactants are reacted with and become part of the polymer.

Drying of the emulsion will, in some embodiments, also result in removal of some portion or a substantial portion of any unreacted volatile monomers. In some embodiments, one or more additional components are added to the emulsion containing the cationic or zwitterionic polymer to form the adhesive composition, and the amended emulsion is employed to coat one or more supports and dried to remove a substantial portion of the water and some or a substantial portion of any other remaining volatile components. After drying, it is desirable that the emulsified adhesive compositions include no more than 1 wt-%, for example, 0.5 wt-% to 5 ppm, or 500 ppm to 10 ppm, or 100 ppm to 1 ppm, of unreacted monomers, based on the total weight of monomers added to the emulsion polymerization reaction vessel.

In certain embodiments, the adhesive coating contains the cationic or zwitterionic polymer plus 2 wt-% to 30 wt-% phenolic resin based on the total weight of the cationic or zwitterionic polymer plus the phenolic resin. The cationic or zwitterionic polymer contains the monomeric units, which are derived from the monomers included in the pre-adhesive reaction mixture. That is, the cationic or zwitterionic polymer contains monomeric units derived from the cationic monomer, monomeric units derived from the nonionic monomer, optional monomeric units derived from the optional anionic monomer, optional monomeric derived from any optional additional monomers, and optional monomers derived from crosslinking monomers. The monomeric units are the polymerized version of the various monomers (e.g., they no longer have an ethylenically unsaturated group).

In some embodiments, the adhesive composition contains at least 70 wt-%, or at least 80 wt-%, or at least 85 wt-% cationic or zwitterionic polymer, based on the total weight of the cationic or zwitterionic polymer plus phenolic resin. In some embodiments, the adhesive composition contains up to 98 wt-%, or up to 95 wt-% cationic or zwitterionic polymer, based on the total weight of the cationic or zwitterionic polymer plus the phenolic resin.

In some embodiments, the adhesive composition contains at least 2 wt-%, at least 3 wt-%, at least 4 wt-%, or at least 5 wt-% phenolic resin, based on the total weight of the cationic or zwitterionic polymer plus the phenolic resin. In some embodiments, the adhesive composition contains up to 30 wt-%, up to 25 wt-%, up to 20 wt-%, or up to 15 wt-%, phenolic resin, based on the total weight of the cationic or zwitterionic polymer plus the phenolic resin.

In some embodiments, the adhesive composition contains 70 wt-% to 98 wt-% cationic or zwitterionic polymer plus 2 wt-% to 30 wt-% phenolic resin, based on the total weight of the cationic or zwitterionic polymer plus the phenolic resin. For example, the adhesive composition can contain 80 wt-% to 98 wt-% cationic or zwitterionic polymer and 2 wt-% to 20 wt-% phenolic resin, or 85 wt-% to 98 wt-% cationic or zwitterionic polymer and 2 wt-% to 15 wt-% phenolic resin, or 85 wt-% to 95 wt-% cationic or zwitterionic polymer and 5 wt-% to 15 wt-% phenolic resin.

The cationic or zwitterionic polymer in any of the adhesive compositions contains the following monomeric units:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

In some example embodiments, the cationic or zwitterionic polymer contains the following monomeric units:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

wt-% to 20 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In other example embodiments, the cationic or zwitterionic polymer contains the following monomeric units:

5 wt-% to 20 wt-%, based on the total weight of monomeric units, of one or more cationic monomeric units derived from a (meth)acrylate ester having an alkyl ammonium functionality, or a mixture of two or more thereof;

60 wt-% to 95 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

wt-% to 10 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 5 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer contains the following monomeric units:

5 wt-% to 15 wt-%, based on the total weight of monomeric units, of one or more cationic monomeric units derived from a (meth)acrylate ester having an alkyl ammonium functionality, or a mixture of two or more thereof;

65 wt-% to 95 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 10 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 5 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In yet other example embodiments where there are no optional additional monomers or optional crosslinking monomers, the cationic or zwitterionic polymer contains the following monomeric units:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof; and wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

Cationically emulsified adhesive compositions of the disclosure are characterized by excellent coating viscosity and high shear stability. In embodiments, the viscosity of a cationically stabilized adhesive composition of the disclosure is 20 centipoise (cP) to 2500 cP, or 100 cP to 1500 cP, or 400 cP to 1000 cP. The emulsion viscosity is determined in part by the solids content of the emulsion and the molecular weight of the cationic or zwitterionic polymer formed. The emulsions are stable under shear stress, such that onset of shear instability occurs at or above 80 Pa, for example, 90 Pa to 300 Pa, or 100 Pa to 200 Pa.

The viscosity and shear stability of the cationically emulsified adhesive compositions of the disclosure provide broad flexibility in selecting coating methods for coating the adhesive compositions onto one or more supports to form a masking article. Non-limiting examples of useful coating processes employed in conjunction with the adhesive compositions include knife coating, slot coating, die coating, flood coating, rod coating, curtain coating, spray coating, brush coating, dip coating, kiss coating, gravure coating, print coating operations such as flexographic, inkjet, or screen print coating, and the like. In some embodiments the adhesive compositions are coated as a continuous coating; in other embodiments they are pattern coated.

Coating of an emulsified adhesive composition is followed by drying using a suitable temperature and period of time for drying that is sufficient to remove a substantial portion of the water and any other volatile substances associated with the emulsion mixture.

Adhesive Articles

The adhesive articles of the disclosure include at least an adhesive composition of the disclosure and a support. It is an advantage of the disclosure that adhesive articles of the disclosure are easy to make, in many embodiments employing a single pass coating operation to fabricate an adhesive article. In embodiments where the adhesive composition is coated as an emulsion, the single coating pass is followed by a drying step. No additional steps are required in order to fabricate an adhesive article of the disclosure.

While the adhesive articles of the disclosure are not particularly limited as to type and shape of the support, in many embodiments the support is a sheet or film suitable for converting to a tape article. The supports may also be provided in roll form. Tape articles are rectangular strips that typically are converted from larger sheets or rolls into the desired width and length. Such conversion is typically carried out after coating the adhesive compositions onto the tape film or sheet. Variables in an adhesive coating process include film or sheet thickness of the support, chemical composition of the support, and nature of the adhesive composition to be coated.

The adhesive articles of the disclosure may be masking articles, whether or not they are used as such. In order to be used as a masking article, any of the adhesive articles described herein are useful as such with no further modification.

An adhesive article is employed in any form or shape, including rectilinear, non-rectilinear shapes, and irregular shapes. Supports employed in forming adhesive articles of the disclosure are typically 12 micrometers to 3 centimeters (cm) thick, or 25 micrometers to 200 micrometers, or 75 micrometers to 150 micrometers thick for a "standard" dimension article, or 200 micrometers to 3 cm for specialized articles. Specialized adhesive articles include articles including a foamed support, for example.

Chemical composition of suitable supports include those selected from a wide variety of polymers and blends thereof. Non-limiting examples of suitable supports include paper, including both flat or smooth paper as well as textured paper such as crepe paper, natural or synthetic polymer films, nonwovens made from natural and/or synthetic fibers and combinations thereof, fabric-reinforced polymer films, fiber- or yarn-reinforced polymer films or nonwovens, and multiple layer laminated constructions.

Examples of suitable synthetic polymer films include those made from polyolefins such as polyethylene or polypropylene, polyvinyl chloride, polytetrafluoroethylene and copolymers thereof with fluorinated and non-fluorinated monomers, polyvinylidene chloride and copolymers thereof, polyvinylidene fluoride and copolymers thereof, polyamides such as nylon 6, nylon 6,6, and nylon 12, polyesters such as polyethylene terephthalate, polylactic acid, and polyethylene naphthalate, polyimides, polyurethanes, polyacrylic esters, polycarbonates, and the like, and blends of two or more such materials. Such support materials include, in some embodiments, additional materials such as fillers, stabilizers, colorants, and the like. Metal supports, such as tin or aluminum film or sheet supports, are also useful in some embodiments. In some embodiments the polymers forming the support are in the form of a foam support. In some embodiments the support is a metalized film. In some embodiments the support is a multilayered support having two or more layers; in some such embodiments the layers are laminated.

Combinations of two or more such compositions and constructions are also useful in various embodiments of the disclosure.

In some embodiments, the support is embossed or micro-embossed; embossed or micro-embossed supports include any of the support materials and constructions described above. In some such embodiments, embossed or micro-embossed features are disposed on the major side of the support contacting the adhesive composition. In other embodiments, the embossed or micro-embossed features are disposed on the major side of the support opposite to the side coated with the adhesive composition. In still other embodiments, embossed or micro-embossed features are disposed on both major sides of the support; the features disposed on the two major sides are the same or different in various embodiments. In some embodiments, the adhesive composition itself includes embossed features, either by virtue of being coated on an embossed surface, or by disposing an adhesive composition between the support and an embossed release liner.

Embossed features imparted to the adhesive compositions themselves are useful, for example, to impart repositionability to the masking articles of the disclosure or allow for air bleed from between the adhesive article and the masked surface. Embossing and micro-embossing are accomplished using techniques known to the skilled artisan and include nip roll embossing using a patterned nip roll, and profile extrusion; secondary processes such as tentering and slicing are further employed in some embodiments to modify surface structures imparted by the embossing or micro-embossing process.

The materials that constitute the support are not particularly limited, and the same materials useful as tape supports are similarly useful in the form of supports other than films or sheets. In various embodiments, such supports are usefully combined with the adhesive compositions of the disclosure to make adhesive articles other than tapes. In some such embodiments, the adhesive articles are masking articles. In other embodiments, the adhesive articles are not used in a masking application. Adhesive articles usefully formed by coating with the adhesive compositions of the disclosure include, for example, roofing shingles, carpet squares, carpet backings, vinyl flooring squares, adhesive wall tiles, wallpapers, decorative decals or stickers, automobile detailing features or decals, and plastic or rubber "bumps" employed as feet, spacers, stops, or protectors on various articles, and any number of other applications where pressure sensitive adhesives are usefully employed. Additional materials such as glass or some rigid/brittle plastics or metals that are not traditionally used as tape supports also have utility in some applications in conjunction with the adhesive compositions of the disclosure.

The width and length of the adhesive articles of the disclosure are not particularly limited. In some embodiments, the adhesive articles of the disclosure are converted to tape articles by slicing a coated sheet or film or roll to widths of 0.25 cm to 10 cm, or 0.5 cm to 7.6 cm; however, the width of a tape article is not particularly limited. Additionally, in some embodiments, the adhesive articles of the disclosure are suitably converted to smaller sheets or rolls, for example, 20 cm by 28 cm sheets, for use by a consumer. In some embodiments, sheets or rolls are provided to a consumer who is then free to divide the sheet or roll into the desired shape and dimensions for use in a specific application.

It is an advantage of the disclosure that the adhesive articles of the disclosure are masking articles, whether or not they are used as such. In order to be used as a masking article, any of the adhesive articles described are useful as such with no further modification.

The shapes easily utilized in conjunction with the supports onto which the adhesive compositions of the disclosure are coated are virtually unlimited in terms of ease of manufacturing and even ease of the end user in converting one supplied shape to a customized shape, for example, by hand cutting with scissors, a box cutter, a hole punch, a die cutter, or any other cutting implement. Thus, for example, a consumer could buy a 20 cm by 28 cm sheet of a masking tape of the disclosure and cut it into the desired shape for a specific end use. Such end uses include, for example, stenciling or patterning wherein the adhesive article is employed to mask an area to be painted and is removed after the paint is applied.

In some embodiments, prior to coating and drying the adhesive compositions of the disclosure on the support, the support is pre-treated. Pre-treatments are applied to, or carried out on, the major surface of the support onto which the adhesive composition will be coated, when an increase in the adhesive bonding between the support and the adhesive composition is necessary to prevent failure of the support-adhesive interface when a tape article or other masking article is removed from the surface onto which it was applied in use.

Pre-treatments include coatings applied to the support surface. One of skill will understand that the nature of such "primer" coatings is specific to each support and specific adhesive composition, and a wide variety of such primer coatings are available—in fact, some support materials are available pre-primed for this purpose. Another type of suitable pre-treatment is roughening the surface of the support prior to coating, which increase surface area for adhesion by the coated adhesive compositions of the disclosure. Yet another type of suitable pre-treatment is corona or plasma treatment of the surface to induce chemical changes that can increase adhesion of the adhesive compositions of the disclosure to the support. While such pre-treatments are useful in some embodiments, in other embodiments many suitable supports, including paper, polyethylene terephthalate, polyvinyl chloride, and polycarbonate, are coated with the compositions in the absence of any type of pre-treatment to improve bonding at the support-adhesive interface.

In some embodiments, where the adhesive article is a tape, the major side opposite the side of the support onto which the adhesive composition will be coated is treated in order to facilitate release of the adhesive from the major side opposite to the adhesive-coated side during unwinding of the tape by the end user. Such coatings, often termed "low adhesion backside" or LAB in the industry, are well known by those of skill and any of the conventionally employed LAB treatments and coatings are suitably applied to the tape supports employed to form the masking tape articles of the disclosure. Conventional LAB treatments are suitably employed in various embodiments of the disclosure to provide tape articles having conventional values of unwind force, for example, of 50 grams per centimeter (g/cm) to 500 g/cm, or 100 g/cm to 350 g/cm, when measured at 180° peel at a rate of 228.6 cm/min and set time of 5 seconds.

In some embodiments, the adhesive article includes a release liner. For example, in some embodiments, it is desirable to form the adhesive article in sheet form, or it is useful for some other reason to avoid having the adhesive article wound upon itself as is commonly done with adhesive tapes. For example, if the end use is a stenciling application, it is generally desirable to employ a release liner—that is, a separate support-type sheet or film—applied to the coated and dried adhesive composition residing on the support. In such embodiments, the support is coated on one major side thereof with the adhesive composition, the adhesive composition is dried if necessary, and a release liner is applied on top of the dried adhesive layer. The release liner is formed from, or coated with, a material that releases cleanly from the adhesive when peeled off by the end user, in embodiments transferring substantially no residue of the release liner material on or in the adhesive. Such release liners are well known by those of skill and any of the conventionally employed release liners are suitably applied to the tape supports employed to form the masking tape articles of the disclosure.

In embodiments where the adhesive article is a tape article, the adhesive compositions of the disclosure are coated onto the selected support at coating weights of 5 grams per square meter (g/m$^2$) to 90 g/m$^2$, or 10 g/m$^2$ to 70 g/m$^2$, or 15 g/m$^2$ to 50 g/m$^2$, of the dried adhesive composition on the support. However, it will be understood that the adhesive articles of the disclosure are not limited to masking tape articles or to masking applications, and for various applications a thicker or thinner coating of the adhesive is useful and is easily optimized by one of skill.

In some embodiments the adhesive compositions of the disclosure are coated discontinuously on a major side of a support onto which no additional adhesive is coated. Pattern coating and stripe coating are useful in some embodiments to provide an "edge-coated only" adhesive article wherein one or both edges of a tape support are coated with the adhesive composition. Such articles have pressure sensitive adhesive performance over only a portion of the major side that contacts a surface in a masking application, and no adhesion at all over the remainder thereof. In some embodiments, edge-coated only adhesive articles reduce the total amount of coated material per unit of area in forming the tape construction. In some embodiments, an edge-coated only adhesive article has a reduced adhesive force per unit of tape area, which in turn aids in removing the article from a surface after application. In some embodiments, by using an edge-coated only masking article, a surface can effectively be masked wherein adhesive does not contact, for example, a very delicate portion of the surface. Such articles are useful, for example, in highly sensitive applications such as artwork restoration, painting of surfaces contiguous to delicate fabrics, painting of surfaces contiguous to very old woodwork having an original finish, or protecting semiconductor surfaces during coating processes. Because in such edge-coated only articles the edge coating is itself a pressure sensitive adhesive, such masking articles can be formed.

An additional advantage of the edge-coated adhesive articles of the disclosure is that the adhesive force of the edge coating (as evidenced by, e.g., peel adhesion level) is easily adjusted in the same manner as described above for the supports coated entirely with the adhesive compositions of the disclosure. Thus, for example, a masking article is easily formed wherein the edges of the coated major side thereof have a greater or lesser amount of adhesive force to the intended substrate compared to the additional adhesive disposed on at least a portion of the remainder of the major side. Similarly, a masking article is easily formed wherein the edges of the coated major side thereof have a greater or lesser amount of tack compared to the additional adhesive disposed on at least a portion of the remainder of the major side.

In various embodiments, the edge-coated adhesive articles are suitably coated with the adhesive compositions of the disclosure at coating weights of 1 g/m$^2$ to 90 g/m$^2$, or 5 g/m$^2$ to 70 g/m$^2$, or 10 g/m$^2$ to 50 g/m$^2$, of the dried adhesive composition. However, it will be understood that the edge-coated adhesive articles of the disclosure are not limited to masking tape articles or to masking applications, and for various applications a thicker or thinner coating of the adhesive composition is useful and is easily optimized by one of skill. Further, the width of the edge coating is not particularly limited; that is, the distance between the outer edge of the major coated surface and the inner edge of the edge coating can encompass any percent of the total width of the support that is less than 100%. In many embodiments, the edge coating encompasses 5% to 50% of the total width of the support.

Edge coating of the adhesive compositions is suitably carried out using any method known to those of skill. For example, stripe coating, knife coating, brush coating, kiss coating, die coating, or curtain coating are useful means to apply the adhesive compositions of the disclosure to the edges of a support.

Applications of the Adhesive Articles

In various embodiments, the adhesive articles of the disclosure are applied to a selected substrate, whereupon the adhesive composition performs as a pressure sensitive adhesive. Pressure sensitive adhesives are recognized as a standard class of materials. Pressure sensitive adhesives are generally recognized as having tack at temperatures ranging from 15° C. to 25° C. and adhesion to a variety of dissimilar surfaces upon mere contact without the need for more than manual pressure. Pressure sensitive adhesives require no activation by water, solvent or heat in order to exert a strong adhesive holding force towards materials such as paper, cellophane, glass, plastic, wood, and metals. Pressure sensitive adhesives have a sufficiently cohesive holding and elastic nature that, despite their aggressive tackiness, they can be handled with the fingers and removed from smooth surfaces without leaving a substantial residue (see, e.g., Test Methods for Pressure sensitive Tapes, 6th Ed., Pressure Sensitive Tape Council, 1953). Pressure sensitive adhesives and tapes are well known, and the wide range and balance of properties desired in such adhesives has been well analyzed (see, e.g., U.S. Pat. No. 4,374,883 (Winslow et al.); and "Pressure sensitive Adhesives" in Treatise on Adhesion and Adhesives Vol. 2, "Materials", R.I. Patrick, Ed., Marcel Dekker, Inc., N.Y., 1969).

Substrates on which the adhesive compositions of the disclosure have good performance as a pressure sensitive adhesive, when combined with a suitable support in an adhesive article, include, but are not limited to, glass, metal, wood (including wood products such as cardboard or particleboard), wallboard, synthetic or natural polymers including filled, colored, crosslinked or surface-modified polymers including, for example, polyvinyl chloride, polyesters such as polyethylene terephthalate or polylactic acid, natural or synthetic rubber, polyamides, polyolefins such as polyethylene or polypropylene, appliance or equipment casing materials such as acrylonitrile-butadiene-styrene (ABS) copolymers, polycarbonate, polymethyl methacrylate, and the like; and mixed or composite materials such as polymer-wood composites, and the like, and any painted or primed surface thereof.

Additionally, it is a feature of the adhesive compositions of the disclosure that adhesion to a selected surface is easily optimized to a desired level while maintaining the level of cationic and/or anionic monomer present in the cationic or zwitterionic polymer. For example, it is possible to adjust adhesion, as measured by PSTC-101, Test Method A (Harmonized International Standard, Peel Adhesion of Pressure Sensitive Tape; available at http://www.pstc.org/ftles/public/101.pdf), to a level of 50 g/cm and 450 g/cm. This can be done, for example, using a constant level of cationic monomer and varying the type and ratio of the other monomers in the cationic or zwitterionic polymer.

Once applied to the selected substrate surface, the adhesive articles of the disclosure are usefully employed in one or more masking applications. The performance of the adhesive articles of the disclosure as masking articles is characterized by the interaction of the adhesive compositions of the disclosure with the liquid and/or liquid-borne solid materials applied to the masked substrate, wherein the interaction results in the substantial prevention of contact by the liquid or liquid-borne materials with the masked surface. To use the masking article to produce sharp, clean, smooth lines of separation between a masked substrate, which is shielded from a coating, and the unmasked region of the substrate to which a liquid coating is applied, the adhesive article is first adhered to the region of the substrate to be shielded from the coating. Next, the coating is applied to the unmasked region of the substrate and applied to at least the edge of the adhesive article. The coating is then allowed to at least partially dry. Last, the adhesive article is removed from the substrate. Because the adhesive article inhibits the migration of the coating beyond the edge of the masked surface, a clear even line of demarcation is produced between the coated region of the substrate and the masked surface of the substrate.

In many masking applications, the liquid coating applied to the masked substrate is a paint formulation. Paint formulations are solid, semisolid, or liquid particles dispersed in a suspension, i.e., a dispersion or an emulsion, typically though not always an aqueous suspension. In many embodiments, paint formulations are emulsions that are anionically stabilized. In some such embodiments, a paint formulation is a water-based latex (e.g., an emulsion polymer) including one or more anionically charged water soluble polymers and dispersed inorganic pigment particles, wherein the pigment particles are kept in a dispersed state by the stabilizing effect of the one or more water soluble polymers. In other embodiments, the paint is a water-based latex formed by stabilizing pigment particles with one or more anionically charged surfactants in addition to one or more water soluble polymers. In such embodiments, the adhesive compositions of the disclosure inhibit the flow of the paint formulation components onto the masked surface, which is the portion of the masked substrate contacting the adhesive composition. The adhesive composition impedes this flow by destabilizing the paint formulation, either by inducing aggregation of particles within the paint formulation, or by increasing the viscosity of the paint formulation, both of which mechanisms tend to form a barrier that impedes, or otherwise inhibits, the migration of the paint formulation beyond the edge of the interface of the masked substrate and the adhesive composition. The cationic monomer present in either the cationic polymer or the zwitterionic polymer of the adhesive composition interacts with the anionic moieties of the paint formulation, causing the observed effect.

In some embodiments, a liquid coating—whether a paint formulation or some other liquid coating material—is cationically stabilized instead of anionically stabilized such as the paint formulations described above. It is a feature of the disclosure that in embodiments wherein the adhesive article includes a zwitterionic polymer, such cationically stabilized liquid coating compositions are effectively stabilized in the same manner as an anionically stabilized water-borne latex is stabilized. That is, the anionic monomers present in the zwitterionic polymer induce aggregation by destabilization, or induce an increase in viscosity, by interaction of the anionic monomers with the cationic moieties present in the latex.

The masking properties of the adhesive articles of the disclosure work to produce paint lines that have a lower degree of variability around a center line defined by the edge of the masked surface than an edge defined by a conventional masking tape. That is, all other variable remaining constant, an edge of a masked surface formed by applying an adhesive article of the disclosure on a selected substrate will produce a paint line having a lower degree of variability around a center line than an edge provided by a standard masking tape. The center line and degree of variability can be determined using known statistical techniques such as the method of least squares, linear regression, and analysis of variance. Additionally, all other variables remaining constant, an edge of a masked surface formed by applying an adhesive article of the disclosure on a selected substrate will produce a paint line having the same or lower degree of variability around a center line than an edge provided by a commercial edge-treated masking tape.

Another aspect of the masking application is removal of the masking article after the coating operation(s) are carried out. It is a feature of the adhesive articles of the disclosure that regardless of the substrate onto which the adhesive article is applied, removal is substantially clean—that is, there is no observable residue left upon removal of the article, and there is no damage to the substrate as a result of removing the adhesive article. Importantly, there is no observable residue left around the masked surface at the edge of the masked surface when the adhesive articles of the disclosure are removed from a substrate after carrying out a masking application. Without wishing to be limited by theory, we believe clean removal of the adhesive articles of the disclosure is due in part to maintenance of a the high cohesive strength of the adhesive composition and high adhesive bonding between the adhesive composition and the support over the entirety of the adhesive article and further throughout application, masking, and removal of the adhesive article. Additionally, while not wishing to be limited by theory, it is believed that preventing the migration of the liquid coating applied in a masking operation into the interface defined as the masked surface, and preventing absorption of any liquid as a means of preventing said migration, results in maintaining the integrity of the adhesive article throughout the masking application and results in easy, clean removal from the substrate after the masking is accomplished.

Exemplary Embodiments

Embodiment 1A is an aqueous polymerizable pre-adhesive reaction mixture comprising: water; one or more cationic (meth)acrylate monomers dissolved in water; and a dispersed phase comprising one or more nonionic (meth)acrylate monomers and one or more phenolic resins.

Embodiment 2A is the aqueous pre-adhesive reaction mixture of embodiment 1A wherein the one or more phenolic resins comprise a terpene phenolic resin, an alkyl phenolic resin, or combinations thereof.

Embodiment 3A is the aqueous pre-adhesive reaction mixture of embodiment 2A wherein the one or more phenolic resins comprise a terpene phenolic resin.

Embodiment 4A is the aqueous pre-adhesive reaction mixture of embodiment 3A wherein the terpene phenolic resin has a hydroxyl value of 20 to 220 mg KOH per gram resin.

Embodiment 5A is the aqueous pre-adhesive reaction mixture of embodiment 4A wherein the terpene phenolic resin has a hydroxyl value of 100 to 220 mg KOH per gram resin.

Embodiment 6A is the aqueous pre-adhesive reaction mixture of any one of embodiments 3A through 5A wherein the terpene phenolic resin has a glass transition temperatures of 40° C. to 120° C.

Embodiment 7A is the aqueous pre-adhesive reaction mixture of any one of embodiments 3A through 6A wherein the terpene phenolic resin has an acid number of less than 0.5.

Embodiment 8A is the aqueous pre-adhesive reaction mixture of embodiment 2A wherein the one or more phenolic resins comprise an alkyl phenolic resin.

Embodiment 9A is the aqueous pre-adhesive reaction mixture of embodiment 8A wherein the alkyl phenolic resin comprises a para-alkylphenol-formaldehyde novolac resin.

Embodiment 10A is the aqueous pre-adhesive reaction mixture of any one of embodiments 1A through 9A wherein the phenolic resin is present in the pre-adhesive reaction mixture in an amount of 2 to 30 parts, or 2 to 20 parts, per one hundred parts total monomers.

Embodiment 11A is the aqueous pre-adhesive reaction mixture of any one of embodiments 1A through 10A wherein the one or more cationic (meth)acrylate monomers comprise a (meth)acrylate ester having an alkyl ammonium functionality (e.g., a trialklylammonium functionality).

Embodiment 12A is the aqueous pre-adhesive reaction mixture of any one of embodiments 1A through 11A wherein the one or more cationic (meth)acrylate monomers are present in the pre-adhesive reaction mixture in an amount of 2 wt-% to 45 wt-%, based on the total weight of the monomers in the pre-adhesive reaction mixture.

Embodiment 13A is the aqueous pre-adhesive reaction mixture of any one of embodiments 1A through 12A wherein the one or more low Tg nonionic monomer comprise methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, or n-dodecyl methacrylate.

Embodiment 14A is the aqueous pre-adhesive reaction mixture of embodiment 13A wherein the one or more low Tg nonionic monomer comprises isooctyl acrylate 2-ethylhexyl acrylate.

Embodiment 15A is the aqueous pre-adhesive reaction mixture of any one of embodiments 1A through 14A wherein the one or more low Tg nonionic monomers are present in the pre-adhesive reaction mixture in an amount of 10 wt-% to 98 wt-% or 50 wt-% to 98 wt-%, based on the total weight of the monomers in the pre-adhesive reaction mixture.

Embodiment 16A is the aqueous pre-adhesive reaction mixture of any one of embodiments 1A through 15A wherein the pre-adhesive reaction mixture further comprises one or more anionic (meth)acrylate monomers.

Embodiment 17A is the aqueous pre-adhesive reaction mixture of embodiment 16A wherein the anionic (meth)acrylate monomers comprise acrylic acid, methacrylic acid, a salt thereof, or a blend thereof.

Embodiment 18A is the aqueous pre-adhesive reaction mixture of embodiment 16A or 17A wherein the one or more anionic (meth)acrylate monomers are present in the pre-adhesive reaction mixture in an amount of 0 wt-% to 5 wt-%, or 0.2 wt-% to 5 wt-%, based on the total weight of the monomers in the pre-adhesive reaction mixture.

Embodiment 19A is the aqueous pre-adhesive reaction mixture of any one of embodiments 1A through 18A, wherein the pre-adhesive reaction mixture comprises:

2 wt-% to 45 wt-%, based on the total weight of monomers, of one or more cationic monomers comprising a (meth)acrylate ester having an alkyl ammonium functionality;

10 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomer, of one or more crosslinking monomers; and wt-% to 5 wt-%, based on the total weight of monomers, of one or more anionic monomers comprising acrylic acid, methacrylic acid, a carboxylate salt monomer, or a mixture of two or more thereof, wherein the amount of carboxylate salt is determined based on the weight of the corresponding free acid.

Embodiment 20A is the aqueous pre-adhesive reaction mixture of any one of embodiments 1A through 19A, wherein the pre-adhesive reaction mixture comprises:

2 wt-% to 20 wt-%, based on the total weight of monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg no greater than 20° C. when homopolymerized;

wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof; and wt-% to 5 wt-%, based on the total weight of the monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

Embodiment 1B is a polymerized product of the aqueous pre-adhesive reaction mixture of any one of embodiments 1A through 20A.

Embodiment 1C is an adhesive composition comprising a cationic or zwitterionic polymer and one or more phenolic resin, wherein the amount of the phenolic resin is in a range of 2 wt-% to 30 wt-% based on a total weight of the cationic or zwitterionic polymer plus the phenolic resin.

Embodiment 2C is the adhesive composition of embodiment 1C, wherein the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

Embodiment 3C is the adhesive composition of embodiment 1C or 2C, wherein the cationic or zwitterionic polymer comprises:

2 wt-% to 20 wt-%, based on the total weight of monomeric units, of one or more cationic monomeric units derived from a (meth)acrylate ester having an alkyl ammonium functionality, or a mixture of two or more thereof; 45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof; and wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

Embodiment 4C is the adhesive composition of embodiments 1C through 3C, wherein the one or more phenolic resins comprise a terpene phenolic resin, an alkyl phenolic resin, or combinations thereof.

Embodiment 5C is the adhesive composition of embodiment 4C wherein the one or more phenolic resins comprise a terpene phenolic resin.

Embodiment 6C is the adhesive composition of embodiment 5C wherein the terpene phenolic resin has a hydroxyl value of 20 to 220 mg KOH per gram resin.

Embodiment 7C is the adhesive composition of embodiment 6C wherein the terpene phenolic resin has a hydroxyl value of 100 to 220 mg KOH per gram resin.

Embodiment 8C is the adhesive composition of any one of embodiments 1C through 7C wherein the terpene phenolic resin has a glass transition temperature of 40° C. to 120° C.

Embodiment 9C is the adhesive composition of any one of embodiments 1C through 8C wherein the terpene phenolic resin has an acid number of less than 0.5.

Embodiment 10C is the adhesive composition of embodiment 4C wherein the one or more phenolic resins comprise an alkyl phenolic resin.

Embodiment 11C is the adhesive composition of embodiment 10C wherein the alkyl phenolic resin comprises a para-alkylphenol-formaldehyde novolac resin.

Embodiment 12C is the adhesive composition of any one of embodiments 2C through 11C wherein the one or more anionic (meth)acrylate monomeric units are present in the zwitterionic polymer in an amount of 0.2 wt-% to 5 wt-%, based on the weight of monomeric units.

Embodiment 13C is the adhesive composition of any one of embodiments 1C through 12C wherein the amount of the phenolic resin is in a range of 5 wt-% to 15 wt-% based on a total weight of the cationic or zwitterionic polymer plus the phenolic resin.

Embodiment 1D is an adhesive article comprising a support having first and second opposed major surfaces, and an adhesive composition of any one of embodiments 1C through 13C disposed on at least a portion of at least one of the first and second opposed major surfaces.

Embodiment 2D is the adhesive article of embodiment 1D wherein the article is a masking tape.

Embodiment 3D is the adhesive article of embodiment 1D wherein the article is a stenciling article.

Embodiment 4D is the adhesive article of embodiment 1D further comprising a release liner contacting at least a portion of the adhesive composition, such that the contacted adhesive composition is disposed between the support and the release liner.

Embodiment 1E is a method of making an adhesive article, the method comprising:

forming an aqueous polymerizable pre-adhesive reaction mixture according to any of embodiments 1A through 20A;

polymerizing the monomers in the pre-adhesive reaction mixture to form a polymerized mixture;

coating the polymerized mixture onto a support to form a coated mixture; and drying the coated mixture.

Embodiment 2E is the method of embodiment 1E wherein the aqueous polymerizable pre-adhesive reaction mixture comprises one or more anionic (meth)acrylate monomers.

Embodiment 3E is the method of embodiment 1E or 2E wherein the pre-adhesive reaction mixture further comprises one or more surfactants.

Embodiment 4E is the method of any one of embodiments 1E through 3E wherein the pre-adhesive reaction mixture further comprises a thermal initiator and the polymerizing is accomplished by heating the pre-adhesive reaction mixture to a temperature of about 40° C. to 80° C.

Embodiment 5E is the method of any one of embodiments 1E through 4E further comprising neutralizing the polymerized mixture to a pH of about 4 to 7.

Embodiment 6E is the method of any one of embodiments 1E through 5E wherein the coating is accomplished by die coating, knife coating, curtain coating, flood coating, spray coating, or cast coating.

Embodiment 7E is the method of any one of embodiments 1E through 6E wherein the support comprises a flat paper, a smooth paper, a textured paper, a natural polymer film, a synthetic polymer film, a natural polymer nonwoven, a synthetic polymer nonwoven, a fabric reinforced film, a fiber or yarn reinforced film, a fiber or yarn reinforced nonwoven, multiple layered constructions thereof, and laminated constructions thereof.

Embodiment 1F is the adhesive article prepared by the method of any one of embodiments 1E through 7E.

Embodiment 2F is the adhesive article of embodiment 1F wherein the article is a masking tape.

Embodiment 1G is an emulsion composition comprising a cationic or zwitterionic polymer and a phenolic resin.

Embodiment 2G is the emulsion composition of embodiment 1G comprising 70 wt-% to 98 wt-% of a cationic or zwitterionic polymer and 2 to 30 wt-% of a phenolic resin, based on a total weight of the cationic or zwitterionic polymer and the phenolic resin.

Embodiment 3G is the emulsion composition of embodiment 1G or 2G, wherein the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

Embodiment 4G is the emulsion composition of any one of embodiments 1G through 3G, wherein the cationic or zwitterionic polymer comprises:

2 wt-% to 20 wt-%, based on the total weight of monomeric units, of one or more cationic monomeric units derived from a (meth)acrylate ester having an alkyl ammonium functionality, or a mixture of two or more thereof; 45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

wt-% to 5 wt-%, based on the total weight of monomeric units, of one or more anionic monomeric units derived from acrylic acid, methacrylic acid, a carboxylate salt thereof, or a mixture of two or more thereof wherein the amount of carboxylate salt is determined based on the weight of the corresponding free acid.

Embodiment 5G is the emulsion composition of embodiments 1G through 4G wherein the one or more phenolic resins comprise a terpene phenolic resin, an alkyl phenolic resin, or combinations thereof.

Embodiment 6G is the emulsion composition of embodiment 5G wherein the one or more phenolic resins comprise a terpene phenolic resin.

Embodiment 7G is the emulsion composition of embodiment 6G wherein the terpene phenolic resin has a hydroxyl value of 20 to 220 mg KOH per gram resin.

Embodiment 8G is the emulsion composition of embodiment 6G wherein the terpene phenolic resin has a hydroxyl value of 100 to 220 mg KOH per gram resin.

Embodiment 9G is the emulsion composition of any one of embodiments 1G through 8G wherein the terpene phenolic resin has a glass transition temperatures of 40° C. to 120° C.

Embodiment 10G is the emulsion composition of any one of embodiments 1G through 9G wherein the terpene phenolic resin has an acid number of less than 0.5.

Embodiment 11G is the emulsion composition of embodiment 1G wherein the one or more phenolic resins comprise an alkyl phenolic resin.

Embodiment 12G is the emulsion composition of embodiment 11G wherein the alkyl phenolic resin comprises a para-alkylphenol-formaldehyde novolac resin.

Embodiment 13G is the emulsion composition of any one of embodiments 1G through 12G wherein the one or more anionic (meth)acrylate monomers are present in the zwitterionic polymer in an amount of 0.2 wt-% to 5 wt-%, based on the weight of monomeric units.

Embodiment 14G is the emulsion composition of any one of embodiments 1G through 13G wherein the amount of the phenolic resin is in a range of 5 wt-% to 15 wt-% based on a total weight of the cationic or zwitterionic polymer plus the phenolic resin.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

TABLE 1

| Glossary of Materials | |
|---|---|
| Designation | Description |
| EC-25 | Cocoalkylmethyl[polyoxyethylene (15)] ammonium chloride, 95% minimum active surfactant solution, available under the trade designation ETHOQUAD C/25, from Akzo Nobel N.V., Amsterdam, Netherlands. |
| IOA | Isooctyl acrylate, obtained from 3M Company, St. Paul, MN. |
| 2-EHA | 2-ethylhexyl acrylate, available from Sigma-Aldrich, St. Louis, MO, USA. |
| MAA | Methacrylic acid, available from Alfa Aesar, Ward Hill, MA. |
| DMAEA-MCL | Dimethylaminoethyl acrylate methyl chloride quaternary, 80% in water, available under trade designation AGEFLEX FA1Q80MC from BASF, Ludwigshafen, Germany. |
| VA | Vinyl acetate, available from Alfa Aesar, Ward Hill, MA. |
| V-50 | 2,2'-Azobis (2-methylpropionamidine) dihydrochloride, a water soluble thermally activated polymerization initiator, available under the trade designation V-50 from Wako Chemicals USA, Richmond, VA. |
| i-STA | A mixture of isostearyl acrylate (88-94 wt %), isohexadecyl acrylate (3-6 wt %), and isoeicosyl acrylate (3-6 wt %), available under trade designation NK ESTER ISA from Kowa American Corporation, New York, NY. |
| POLYSTER UH115 | Terpene phenolic resin, having a softening point of 115° C. and a hydroxyl value of 20 milligrams KOH/gram resin, available under the trade designation POLYSTER UH115 from Yasuhara Chemicals Company, Limited, Hiroshima, Japan. |
| POLYSTER TH130 | Terpene phenolic resin, having a softening point of 130° C. and a hydroxyl value of 50 milligrams KOH/gram resin, available under the trade designation POLYSTER TH130 from Yasuhara Chemicals Company, Limited, Hiroshima, Japan. |
| POLYSTER S145 | Terpene phenolic resin, having a softening point of 145° C. and a hydroxyl value of 100 milligrams KOH/gram resin, available under the trade designation POLYSTER S145 from Yasuhara Chemicals Company, Limited, Hiroshima, Japan. |
| POLYSTER K125 | Terpene phenolic resin, having a softening point of 125° C. and a hydroxyl value of 200 milligrams KOH/gram resin, available under the trade designation POLYSTER K125 from Yasuhara Chemicals Company, Limited, Hiroshima, Japan. |
| POLYSTER K140 | Terpene phenolic resin, having a softening point of 140° C. and a hydroxyl value of 200 milligrams KOH/gram resin, available under the trade designation POLYSTER K140 from Yasuhara Chemicals Company, Limited, Hiroshima, Japan. |
| DERTOPHENE 1510 | Terpene phenolic resin, having a softening point of 147° C. and a hydroxyl value of 92-125 milligrams KOH/gram resin, available under the trade designation DERTOPHENE 1510 from DRT, Cedex, France. |

TABLE 1-continued

Glossary of Materials

| Designation | Description |
| --- | --- |
| DERTOPHENE H150 | Terpene phenolic resin, having a softening point of 118° C. and a hydroxyl value of 135-150 milligrams KOH/gram resin, available under the trade designation DERTOPHENE H150 from DRT, Cedex, France. |
| SYLVARES TP 7042 | Terpene phenolic resin, having a softening point of 147° C. and a hydroxyl value of 100 milligrams KOH/gram resin, available under the trade designation SYLVARES TP 7042 from Arizona Chemical, Jacksonville, FL. |
| SYLVARES TP 300 | Terpene phenolic resin, having a softening point of 109-114° C. and a hydroxyl value of 150 milligrams KOH/gram resin, available under the trade designation SYLVARES TP 300 from Arizona Chemical, Jacksonville, FL. |
| SP 1077 | Phenolic resin, having a softening point of 92-101° C. and a hydroxyl value of 220-280 milligrams KOH/gram resin, available under the trade designation SP 1077 from SI Group, Schenectady, NY. |
| CRJ-418 | Phenolic resin, having a softening point of 106-114° C. and a hydroxyl value of 220-280 milligrams KOH/gram resin, available under the trade designation CRJ-418 from SI Group, Schenectady, NY. |

Test Methods

Glass Transition Temperature (Tg)

Samples were prepared by coating the polymer (e.g., polymerized emulsion composition) onto a TEFLON substrate and drying at 70° C. The dried film was removed and folded several times to yield a sample having a thickness of approximately 1 to 2 millimeters (0.04 to 0.08 inch). A test sample measuring 8 millimeters (0.31 inch) in diameter was punched out and placed between the 8 millimeter diameter, steel parallel plates of a rheometer (Model DHR-2 Discover Hybrid Rheometer, TA Instruments, New Castle, Del.) and dynamic mechanical analysis was carried out to determine the Tg. The following parameters were employed: a controlled shear strain of 5% at frequency of 1 radian/second, and a temperature ramp from −65° C. to 175° C. at a rate of 3° C./minute. The glass transition temperature (Tg) was taken as the peak of the tan delta curve.

Stainless Steel or Glass Peel Adhesion Strength (180 Degree Angle)

Stainless steel (SS) or Glass plates, measuring 30.48 centimeters (12 inches) long by 12.7 centimeters (5 inches) wide by 0.13 centimeter (0.050 inch) thick, were prepared for testing by cleaning with methyl ethyl ketone and a clean tissue (available under the trade designation KIMWIPE, from Kimberly-Clark Corporation, Neenah, Wis.) three times with the last cleaning taking place immediately preceding sample preparation. The adhesive tapes were cut into strips measuring 2.54 centimeters (1 inch) wide and at least 30.48 centimeters (12 inches) long and bonded to the plate such that the contact area was 2.54 centimeters (1 inch) wide by approximately 25.4 centimeters (10 inches) long. A 2 kilogram (4.5 pound) rubber roller was then rolled back and forth twice over the assembly. Within a minute after applying the tape, the peel test was run at an angle of 180 degrees and a rate of 228.6 centimeters/minute (90 inches/minute) with an average data acquisition time of two seconds using a using peel tester (Model IMASS SP-2000 Slip/Peel Tester, available from IMASS, Inc., Accord, Mass.). At least three peel test measurements of each adhesive tape sample were evaluated and the results were recorded and averaged in ounces force/inch (Newtons/decimeter).

Preparation of Painted Substrate:

Birch wood panels (obtained from Mailand Wood Products, Centuria, Wis.) primed with a coat of PROMAR 200 ZERO VOC PRIMER (Sherwin-Williams Company, Cleveland, Ohio) and measuring 15.24 centimeters (6 inches) by 30.48 centimeters (12 inches) were coated with one of the test paints shown in Table 2 below.

TABLE 2

Description of painted substrates

| Paint | Brand | Paint Type | Finish | Base | Color |
| --- | --- | --- | --- | --- | --- |
| 1 | Sherwin-Williams (Cleveland, OH) | PROMAR 200 ZERO VOC* | Egg-Shell | White | Extra White |
| 2 | Behr (Santa Ana, CA) | PREMIUM PLUS ULTRA | Flat | Deep | Egyptian Nile |

*The paint is different from the primer that the wood panels came with.

Two coats of the test paint was applied to the primed side of a wood panel using a Purdy WHITE DOVE one quarter inch nap paint roller (available from Purdy Corporation, Cleveland, Ohio). Rolling was done length wise along the birch board, perpendicular to the direction of tape application. The first coat of paint was allowed to dry to the touch before applying the second coat. The painted substrates were allowed to cure by standing at room temperature for a minimum of 7 days prior to testing.

Painted Substrate Peel Adhesion Strength (180 Degree Angle)

The adhesive tapes were cut into strips measuring 2.54 centimeters (1 inch) wide and at least 15.24 centimeters (6 inches) long and bonded with the tape length across the width of the painted substrate such that the contact area was 2.54 centimeters (1 inch) wide by approximately 12.7 centimeters (5 inches) long. A 2 kilogram (4.5 pound) rubber roller was then rolled back and forth twice over the assembly. Within a minute after applying the tape, the peel test was run at an angle of 180 degrees and a rate of 228.6 centimeters/minute (90 inches/minute) with an average data acquisition time of two seconds using a using peel tester (Model IMASS SP-2000 Slip/Peel Tester, available from IMASS, Inc., Accord, Mass.). At least three peel test measurements of each adhesive tape sample were evaluated and the results were recorded and averaged in ounces force/inch (Newtons/decimeter).

General Procedures

Emulsion Polymer Synthesis A: Without Phenolic Resin

A clean 2 liter glass reactor equipped with stirrer, reflux condenser, heat lamps, thermometer, a temperature controller, and nitrogen purge was used. Water and EC-25 surfactant were charged into the reactor. Stirring was begun at 250 rpm followed by addition of MAA, VA, and IOA and then purging with nitrogen for 30 minutes at 2 liters/minute. Next, the reactor was heated to 50° C. and, after stabilizing at that temperature, the first charge (0.5 parts per hundred (pph) of total monomer) of V-50 water soluble initiator was added. After two hours, a second charge (0.05 pph) of V-50 was added and the temperature increased to 65° C. and held there for two hours, after which the pre-adhesive reaction mixture was allowed to cool to room temperature. The pH of the pre-adhesive reaction mixture was then adjusted between 5 and 7 by adding aqueous sodium hydroxide solution followed by filtering the pre-adhesive reaction mixture through cheese cloth. The amount of filtered coagulum was typically less than 1% by weight of the total amount of monomer, unless otherwise noted. The resulting emulsion without phenolic resin was found to contain less than 0.5 wt-% unreacted monomer by gravimetric analysis.

Emulsion Polymer Synthesis B: With Phenolic Resin

Emulsion Polymer Synthesis A was repeated with the following modifications. In a clean beaker, a phenolic resin was combined with IOA monomer, and mixed until the resin dissolved completely to create an IOA/phenolic resin premix. This premix was then used in place of IOA alone to prepare an emulsion with phenolic resin as described in the "Emulsion Polymer Synthesis A" preparation. The resulting emulsion with phenolic resin was found to contain less than 0.5 wt-% unreacted monomer by gravimetric analysis.

Emulsion Polymer Synthesis C: Without Phenolic Resin

To a 0.95 liter (32 ounce) glass jar having a 2.54 centimeters (1 inch) plastic cap were charged with IOA or 2-EHA followed by addition of chain transfer agent carbon tetrabromide (CBr$_4$), DMAEA-MCL, MAA, VA, water, EC-25, and V-50 (0.375 pph). The pre-adhesive reaction mixture was purged with nitrogen for two minutes, after which the bottle was closed tight. Next, the bottle was placed in a LAUNDER-OMETER (available from SDL ATLAS, Rock Hill, S.C.) rotating water bath set at 50° C. for 24 hours. The pH of the resulting solution was adjusted to between 5 and 5.5 by adding aqueous sodium hydroxide solution, followed by filtering through a PET-50GG-355 mesh having an opening of 355 micrometers (available from Sefar Inc., Buffalo, N.Y.) The amount of filtered coagulum was typically less than 1% by weight of the total amount of monomer, unless otherwise noted. The resulting emulsion without phenolic resin was found to contain less than 0.5% wt. percent unreacted monomer by gravimetric analysis.

Emulsion Polymer Synthesis D: With Phenolic Resin

Emulsion Polymer Synthesis C was repeated with the following modifications. A phenolic resin was combined with IOA or 2-EHA monomer, and mixed until the resin dissolved completely to create a monomer/phenolic resin premix. This premix was then used in place of IOA or 2-EHA alone to prepare an emulsion with hydrocarbon resin as described in the "Emulsion Polymer Synthesis C" preparation. The resulting emulsion with phenolic resin was found to contain less than 0.5% wt. percent unreacted monomer by gravimetric analysis.

Preparation of Adhesive Tapes

Adhesive tape samples were prepared by knife coating an emulsion onto the primed side of a paper substrate suitable for use as a masking tape substrate (saturated with an acrylic saturant similar to the type disclosed in U.S. Pat. Publ. No. 2015/0035204 (Stoner et al.) and primed with a polyvinylidene chloride primer) measuring 15.24 centimeters (6 inches) wide and 0.14 millimeters (0.0054 inch) thick using a gap setting between 0.076 to 0.102 millimeters (0.003 to 0.004 inch) greater than the thickness of the paper. The coated paper substrate was dried in a forced air oven at 70° C. for approximately five minutes. Prior to evaluating peel adhesion strength, the adhesive tape samples were equilibrated overnight at a constant temperature and humidity of 23° C. and 50% relative humidity.

Comparative Example 1 (CE 1)

Comparative Example 1 having no phenolic resin was prepared using "Emulsion Polymer Synthesis A" described above. The resulting emulsion had a percent solids of approximately 45-50 wt %. This was used to prepare samples for evaluation of glass transition temperature (Tg) and 180 degree angle peel adhesion strength. The composition and results are shown in Tables 3 and 4 below.

Examples 1-18

Examples 1-18 having phenolic resin were prepared using "Emulsion Polymer Synthesis B" described above. The resulting emulsions had a percent solids of approximately 45-50 wt %. These were used to prepare samples for evaluation of glass transition temperature (Tg) and 180 degree angle peel adhesion strength. The compositions are shown in Table 3. Phenolic resin was added in the amount shown as a parts per hundred (pph) of total monomer. The results are shown in Table 4.

TABLE 3

Compositions of Comparative Example 1 and Examples 1-18

| Ex. | IOA (g) | DMAEA-MCL (g solid) | VA (g) | MAA (g) | EC-25 (g) | Water (g) | Phenolic Resin | Phenolic Resin (pph) |
|---|---|---|---|---|---|---|---|---|
| CE 1 | 85 | 8 | 5 | 2 | 2 | 110 | None | 0 |
| 1 | 85 | 8 | 5 | 2 | 2 | 115 | POLYSTER UH115 | 11.1 |
| 2* | 85 | 8 | 5 | 2 | 2.7 | 130 | POLYSTER UH115 | 25 |
| 3 | 85 | 8 | 5 | 2 | 2 | 105 | POLYSTER TH130 | 5.25 |
| 4 | 85 | 8 | 5 | 2 | 2 | 105 | POLYSTER TH130 | 17.65 |
| 5* | 85 | 8 | 5 | 2 | 2.7 | 130 | POLYSTER TH130 | 25 |
| 6 | 85 | 8 | 5 | 2 | 2 | 112.5 | POLYSTER S145 | 5.25 |

TABLE 3-continued

Compositions of Comparative Example 1 and Examples 1-18

| Ex. | IOA (g) | DMAEA-MCL (g solid) | VA (g) | MAA (g) | EC-25 (g) | Water (g) | Phenolic Resin | Phenolic Resin (pph) |
|---|---|---|---|---|---|---|---|---|
| 7 | 85 | 8 | 5 | 2 | 2 | 120 | POLYSTER S145 | 11.1 |
| 8* | 85 | 8 | 5 | 2 | 2 | 127.5 | POLYSTER S145 | 17.65 |
| 9 | 85 | 8 | 5 | 2 | 2 | 112.5 | DERTOPHENE 1510 | 5.25 |
| 10 | 85 | 8 | 5 | 2 | 2 | 120 | DERTOPHENE 1510 | 11.1 |
| 11 | 85 | 8 | 5 | 2 | 2 | 127.5 | DERTOPHENE 1510 | 17.65 |
| 12 | 85 | 8 | 5 | 2 | 2 | 112.5 | DERTOPHENE H 150 | 5.25 |
| 13* | 85 | 8 | 5 | 2 | 2 | 120 | DERTOPHENE H 150 | 11.1 |
| 14 | 85 | 8 | 5 | 2 | 2 | 120 | SYLVARES TP 7042 | 11.1 |
| 15 | 85 | 8 | 5 | 2 | 2 | 127.5 | SYLVARES TP 7042 | 17.65 |
| 16 | 85 | 8 | 5 | 2 | 2 | 120 | SYLVARES TP 300 | 11.1 |
| 17* | 85 | 8 | 5 | 2 | 2 | 127.5 | SYLVARES TP 300 | 17.65 |
| 18 | 85 | 8 | 5 | 2 | 2 | 115 | SP 1077 | 5.25 |

*Coagulum of 2-5% of the solids were observed and filtered off.

Coagulum is undesired and may be readily removed, by filtration, for example. Unless otherwise noted, all samples had a coagulum less than 0.2 wt % of the solids.

TABLE 4

Characterization of Comparative Example 1 and Examples 1-18

| Example | Phenolic type resin | Resin Amount (pph) | Hydroxyl Value (mg KOH/g resin) | Tg (° C.) | SS Peel Adhesion (oz/in; N/cm) |
|---|---|---|---|---|---|
| CE 1 | — | 0 | — | −44.7 | 33.2; 3.63 |
| 1 | POLYSTER UH115 | 11.1 | 20 | −34.6 | 33.2; 3.63 |
| 2* | POLYSTER UH115 | 25 | 20 | −26.5 | 4.0; 0.44 |
| 3 | POLYSTER TH130 | 5.25 | 50 | −41.0 | 32.6; 3.57 |
| 4 | POLYSTER TH130 | 17.65 | 50 | −31.6 | 36.6; 4.01 |
| 5* | POLYSTER TH130 | 25 | 50 | −23.1 | 5.0; 0.55 |
| 6 | POLYSTER S145 | 5.25 | 100 | −39.8 | 30.5; 3.34 |
| 7 | POLYSTER S145 | 11.1 | 100 | −35.1 | 51.4; 5.63 |
| 8* | POLYSTER S145 | 17.65 | 100 | −30.0 | 35.1; 3.84 |
| 9 | DERTOPHENE 1510 | 5.25 | 92-125 | −39.2 | 33.0; 3.61 |
| 10 | DERTOPHENE 1510 | 11.1 | 92-125 | −32.6 | 43.9; 4.81 |
| 11 | DERTOPHENE 1510 | 17.65 | 92-125 | −27.5 | 32.8; 3.59 |
| 12 | DERTOPHENE H 150 | 5.25 | 135-150 | −41.5 | 47.5; 5.20 |
| 13* | DERTOPHENE H 150 | 11.1 | 135-150 | −31.6 | 49.3; 5.40 |
| 14 | SYLVARES TP 7042 | 11.1 | 100 | −33.5 | 37.8; 4.14 |
| 15 | SYLVARES TP 7042 | 17.65 | 100 | −29.7 | 41.2; 4.51 |
| 16 | SYLVARES TP 300 | 11.1 | 150 | −36.6 | 46.5; 5.09 |
| 17* | SYLVARES TP 300 | 17.65 | 150 | −44.7 and 111 | 24.6; 2.69 |
| 18 | SP 1077 | 5.25 | 220-280 | −31.3 | 71.1; 7.78 |

*Coagulum of 2-5% of the solids were observed and filtered off.

The above examples show that a range of phenolic resins can be used in making a stable emulsion polymer. The increase in the Tg of the inventive examples (1-18) compared to the comparative example (CE 1) demonstrates successful tackification with the phenolic resins. The adhesion to stainless steel substrate is best improved with phenolic resins having hydroxyl value of 100 milligrams KOH per gram resin or more and present in an amount of 5 to 10 phr.

Comparative Example 2 (CE 2)

Comparative Example 2 having no phenolic resin was prepared using "Emulsion Polymer Synthesis C" described above. The resulting emulsion had a percent solids of approximately 50 wt %. This was used to prepare samples for evaluation of glass transition temperature (Tg) and 180 degree angle peel adhesion strength. The composition and results are shown in Tables 5 and 6 below.

Examples 19-23

Examples 19-23 having phenolic resin were prepared using "Emulsion Polymer Synthesis D" described above. The resulting emulsions had a percent solids of approximately 50 wt %. These were used to prepare samples for evaluation of glass transition temperature (Tg) and 180 degree angle peel adhesion strength. The composition and results are shown in Tables 5 and 6 below.

TABLE 5

Compositions of Comparative Example 2 and Examples 19-23

| Ex. | 2-EHA (g) | DMAEA-MCL (g solid) | VA (g) | MAA (g) | IBOA (g) | i-STA (g) | CBr4 (pph) | EC-25 (g) | Water (g) | Phenolic Resin | Phenolic Resin (pph) |
|---|---|---|---|---|---|---|---|---|---|---|---|
| CE 2 | 85 | 8 | 5 | 2 | 0 | 0 | 0.03 | 1 | 100 | None | 0 |
| 19 | 85 | 8 | 5 | 2 | 0 | 0 | 0.03 | 1 | 100 | SYLVARES TP 300 | 10 |
| 20 | 80 | 8 | 5 | 2 | 5 | 0 | 0.03 | 1 | 100 | SYLVARES TP 300 | 10 |
| 21 | 80 | 8 | 5 | 2 | 5 | 0 | 0.05 | 1 | 100 | SYLVARES TP 300 | 10 |
| 22 | 75 | 8 | 5 | 2 | 10 | 0 | 0.05 | 1 | 100 | SYLVARES TP 300 | 10 |
| 23 | 75 | 8 | 5 | 2 | 0 | 10 | 0.03 | 1 | 100 | SYLVARES TP 300 | 10 |

TABLE 6

Characterization of Comparative Example 2 and Examples 19-23

| Ex. | Phenolic type resin | Resin Amount (pph) | IBOA (g) | i-STA (g) | CBr4 (pph) | Tg (° C.) | Glass Peel Adhesion (oz/in; N/cm) | Paint 1 Peel Adhesion (oz/in; N/cm) | Paint 2 Peel Adhesion (oz/in; N/cm) |
|---|---|---|---|---|---|---|---|---|---|
| CE 2 | None | 0 | 0 | 0 | 0.03 | −51.7 | 27.8; 3.1 | 10.6; 1.2 | 7.2; 0.8 |
| 19 | SYLVARES TP 300 | 10 | 0 | 0 | 0.03 | −44.1 | 41.8; 4.6 | 22.4; 2.5 | 18.1; 2.0 |
| 20 | SYLVARES TP 300 | 10 | 5 | 0 | 0.03 | −38.4 | 47.8; 5.3 | 26.6; 2.9 | 11.7; 1.3 |
| 21 | SYLVARES TP 300 | 10 | 5 | 0 | 0.05 | −39.4 | 51.4; 5.7 | 28.8; 3.2 | 15.0; 1.6 |
| 22 | SYLVARES TP 300 | 10 | 10 | 0 | 0.05 | −34.7 | 54.6; 6.0 | 27.7; 3.0 | 15.0; 1.6 |
| 23 | SYLVARES TP 300 | 10 | 0 | 10 | 0.03 | −49.8 | 31.1; 3.4 | 24.4; 2.7 | 16.6; 1.8 |

The above examples demonstrate the versatility of this inventive approach with several polymer chemistries for providing a range adhesive performance across substrates. The adhesive can be adjusted to have high adhesion strength to stainless steel and Paint 1 by adding high Tg monomer IBOA (Ex 19 versus Ex 20) and increasing the amount of chain transfer agent CBr$_4$ (Ex 20 versus Ex 21). The level of adhesion to stainless steel can be alternatively be lowered down by adding i-STA (Ex 19 versus Ex 23) while adhesion to Paint 1 slightly increases and Paint 2 slightly decreases.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An aqueous polymerizable pre-adhesive reaction mixture comprising:
   water;
   one or more cationic (meth)acrylate monomers; and
   a dispersed phase comprising one or more low Tg nonionic monomers and one or more phenolic resins, wherein the low Tg nonionic monomers have a (meth)acryloyl group and have a Tg of no greater than 20° C. when homopolymerized.

2. The aqueous pre-adhesive reaction mixture of claim 1 wherein the one or more phenolic resins comprise a terpene phenolic resin, an alkyl phenolic resin, or combinations thereof.

3. The aqueous pre-adhesive reaction mixture of claim 2 wherein the one or more phenolic resins comprise a terpene phenolic resin.

4. The aqueous pre-adhesive reaction mixture of claim 3 wherein the terpene phenolic resin has a hydroxyl value of 20 to 220 mg KOH per gram resin.

5. The aqueous pre-adhesive reaction mixture of claim 2 wherein the one or more phenolic resins comprise an alkyl phenolic resin.

6. The aqueous pre-adhesive reaction mixture of claim 5 wherein the alkyl phenolic resin comprises a para-alkylphenol-formaldehyde novolac resin.

7. The aqueous pre-adhesive reaction mixture of claim 1 wherein the phenolic resin is present in the pre-adhesive reaction mixture in an amount of 2 to 30 parts per one hundred parts of total monomers.

8. The aqueous pre-adhesive reaction mixture of claim 1 wherein the one or more cationic (meth)acrylate monomers comprise a (meth)acrylate ester having an alkyl ammonium functionality, or a mixture of two or more thereof.

9. The aqueous pre-adhesive reaction mixture of claim 1 wherein the low Tg nonionic monomer is an alkyl acrylate with the alkyl being a non-tertiary alkyl group having 1 to 18 carbon atoms.

10. The aqueous pre-adhesive reaction mixture of claim 1 wherein the pre-adhesive reaction mixture further comprises one or more anionic (meth)acrylate monomers.

11. A polymerized product of the aqueous pre-adhesive reaction mixture of claim 1.

12. An adhesive composition comprising 70 wt-% to 98 wt-% of a cationic or zwitterionic polymer and 2 wt-% to 30 wt-% of a phenolic resin, based on the total weight of the cationic or zwitterionic polymer plus the phenolic resin.

13. The adhesive composition of claim 12, wherein the cationic or zwitterionic polymer comprises:
   2 wt-% to 45 wt-%, based on the total weight of monomers, of one or more cationic monomers comprising a (meth)acrylate ester having an alkyl ammonium functionality;

10 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomer, of one or more crosslinking monomers; and 0 wt-% to 5 wt-%, based on the total weight of monomers, of one or more anionic monomers comprising acrylic acid, methacrylic acid, a carboxylate salt monomer, or a mixture of two or more thereof, wherein the amount of carboxylate salt is determined based on the weight of the corresponding free acid.

14. The adhesive composition of claim 12, wherein the cationic or zwitterionic polymer comprises:

2 wt-% to 20 wt-%, based on the total weight of monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg no greater than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof; and 0 wt-% to 5 wt-%, based on the total weight of the monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

15. An adhesive article comprising a support having first and second opposed major surfaces, and an adhesive composition of claim 12 disposed on at least a portion of at least one of the first and second opposed major surfaces.

* * * * *